(12) United States Patent
Hayashida et al.

(10) Patent No.: US 11,238,852 B2
(45) Date of Patent: Feb. 1, 2022

(54) SPEECH TRANSLATION DEVICE, SPEECH TRANSLATION METHOD, AND RECORDING MEDIUM THEREFOR

(71) Applicant: Panasonic Corporation, Osaka (JP)

(72) Inventors: Kohhei Hayashida, Kyoto (JP); Atsushi Sakaguchi, Kyoto (JP); Kazuya Nomura, Osaka (JP); Hiroki Furukawa, Osaka (JP); Tsuyoki Nishikawa, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 283 days.

(21) Appl. No.: 16/363,407

(22) Filed: Mar. 25, 2019

(65) Prior Publication Data

US 2019/0304442 A1    Oct. 3, 2019

Related U.S. Application Data

(60) Provisional application No. 62/649,917, filed on Mar. 29, 2018.

(30) Foreign Application Priority Data

Nov. 19, 2018    (JP) .............................. JP2018-216723

(51) Int. Cl.
*G10L 15/20*    (2006.01)
*G06F 40/58*    (2020.01)
(Continued)

(52) U.S. Cl.
CPC .............. *G10L 15/20* (2013.01); *G06F 40/58* (2020.01); *G10L 15/22* (2013.01); *H04R 1/326* (2013.01); *G10L 2015/225* (2013.01)

(58) Field of Classification Search
CPC ... G10L 15/20; G10L 15/22; G10L 2015/225; H04R 1/326; G06F 40/58
See application file for complete search history.

(56) References Cited

U.S. PATENT DOCUMENTS

2009/0111507 A1*  4/2009  Chen ................... H04M 1/6008
                                                      455/550.1
2012/0089392 A1*  4/2012  Larco .................... G10L 15/063
                                                        704/231
(Continued)

FOREIGN PATENT DOCUMENTS

JP         2005-283797         10/2005

*Primary Examiner* — Sonia L Gay
(74) *Attorney, Agent, or Firm* — Wenderoth, Lind & Ponack, L.L.P.

(57) ABSTRACT

A speech translation device includes: a beamformer which forms, from a speech signal obtained by a microphone array, a first beam and a second beam having different directions; a direction designator which designates one of the first beam and the second beam according to a user operation; a signal-to-noise (SN) ratio calculator which calculates an SN ratio using the designated beam as a signal component in the SN ratio, and the other beam not designated as a noise component; a display determiner which determines whether recognition of the designated beam is difficult, using the calculated SN ratio, and determines a speaking instruction for overcoming difficulty of the recognition when determining that the recognition is difficult; and a display which displays the speaking instruction determined by the display determiner in a display area.

13 Claims, 21 Drawing Sheets

(51) Int. Cl.
*G10L 15/22* (2006.01)
*H04R 1/32* (2006.01)

(56) References Cited

U.S. PATENT DOCUMENTS

| | | | |
|---|---|---|---|
| 2013/0216050 A1* | 8/2013 | Chen | H04M 9/082 |
| | | | 381/56 |
| 2013/0238312 A1* | 9/2013 | Waibel | G10L 15/1815 |
| | | | 704/8 |
| 2014/0188455 A1* | 7/2014 | Manuselis | H04R 1/406 |
| | | | 704/3 |
| 2014/0365200 A1* | 12/2014 | Sagie | G06F 40/51 |
| | | | 704/2 |
| 2016/0012827 A1* | 1/2016 | Alves | H04R 3/005 |
| | | | 381/71.1 |
| 2019/0147870 A1* | 5/2019 | Taki | G10L 25/84 |
| | | | 704/233 |

* cited by examiner

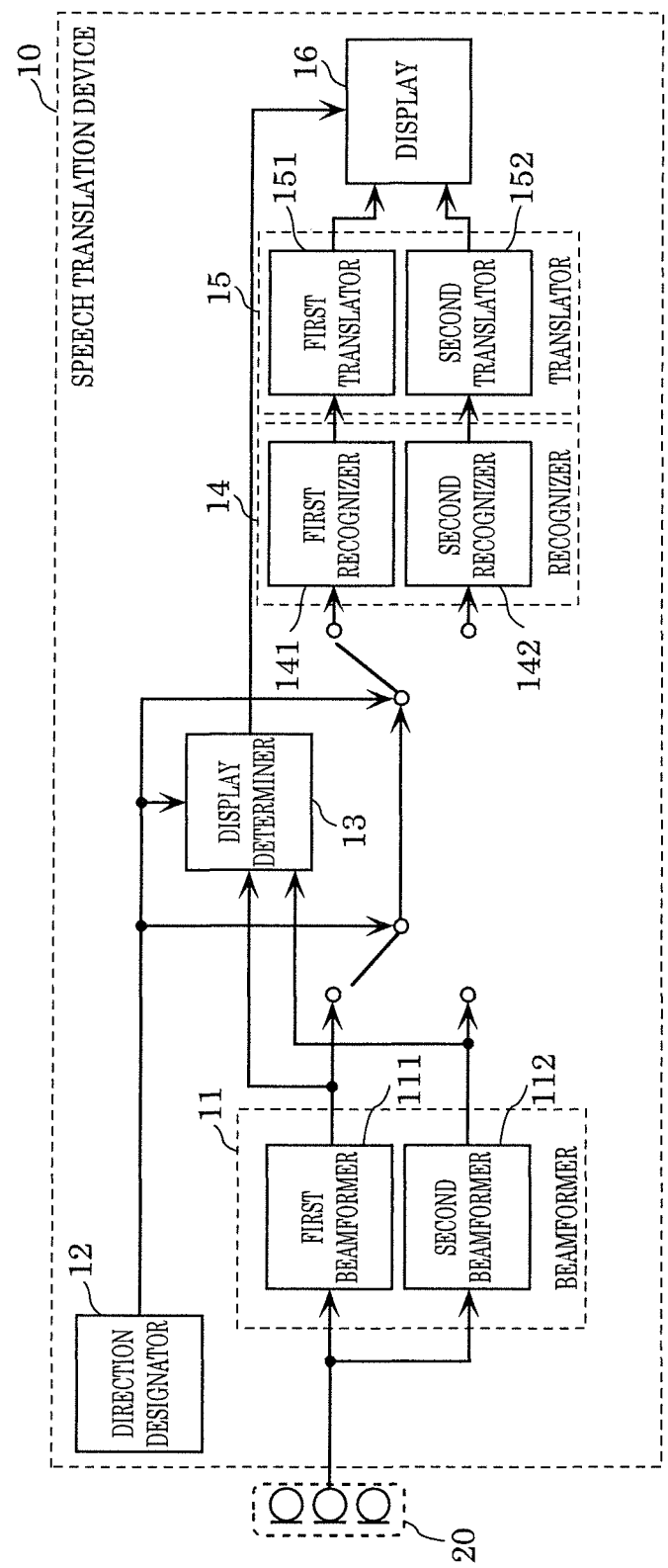

SPEECH TRANSLATION DEVICE, SPEECH TRANSLATION METHOD, AND RECORDING MEDIUM THEREFOR

CROSS REFERENCE TO RELATED APPLICATIONS

This application claims the benefit of priority of U.S. Provisional Patent Application No. 62/649,917 filed on Mar. 29, 2018 and Japanese Patent Application Number 2018-216723 filed on Nov. 19, 2018, the entire contents of which are hereby incorporated by reference.

BACKGROUND

1. Technical Field

The present disclosure relates to a speech translation device, a speech translation method, and a recording medium therefor.

2. Description of the Related Art

As a tool for speakers of different languages to communicate with each other, there has been a speech translation device which translates the speech of one of the speakers into the language of the other speaker and vice versa. However, such a speech translation device often fails to correctly recognize speech of a speaker due to the influence of noise, for instance, and thus fails to correctly translate the speech.

For example, Japanese Unexamined Patent Application Publication No. 2005-283797 proposes a technology of correcting the content incorrectly recognized through speech recognition processing by a user saying simple words. Accordingly, the content incorrectly recognized can be readily corrected without the user saying again all the words that the user said first.

SUMMARY

The technology disclosed by Japanese Unexamined Patent Application Publication No. 2005-283797 may result in incorrect recognition of the words that the user said again by the speech recognition processing if there is no change in the noisy environment. In such a case, the user does not know what he/she can do to have the speech translation device correctly recognize his/her speech.

The present disclosure has been conceived in view of the above circumstances, and is to provide a speech translation device and a speech translation method for determining that speech recognition is difficult due to noise, for instance, and notifying a user of an action for overcoming the difficulty, and a recording medium for the speech translation method.

A speech translation device according to an aspect of the present disclosure includes: a first beamformer which calculates first beamformer output which is a signal resulting from processing a speech signal obtained by a microphone array to direct a directivity for picking up sound in a first direction; a second beamformer which calculates second beamformer output which is a speech signal resulting from processing the speech signal obtained by the microphone array to direct the directivity for picking up sound in a second direction different from the first direction; a direction designator which designates, according to a user operation, one output among output from the first beamformer and output from the second beamformer; a first recognizer which recognizes content indicated by the first beamformer output as first content in a first language by performing, on the first beamformer output, recognition processing in the first language when the one output designated by the direction designator is a first beam formed by the first beamformer; a first translator which translates the first content recognized by the first recognizer into a second language; a second recognizer which recognizes content indicated by the second beamformer output as second content in the second language by performing, on the second beamformer output, recognition processing in the second language when the one output designated by the direction designator is a second beam formed by the second beamformer; a second translator which translates the second content recognized by the second recognizer into the first language; a signal-to-noise (SN) ratio calculator which calculates an SN ratio, using the one output designated by the direction designator as a signal component in the SN ratio, and the other output not designated by the direction designator among the output from the first beamformer and the output from the second beamformer, as a noise component in the SN ratio; a display determiner which determines, using the SN ratio calculated by the SN ratio calculator, whether recognition of the one output designated by the direction designator is difficult and determines, when the display determiner determines that the recognition is difficult, a speaking instruction for overcoming difficulty of the recognition, the speaking instruction being to be notified to a user; and a display which displays, in a display area, one of output from the first translator, output from the second translator, and the speaking instruction determined by the display determiner.

Note that specific aspects of the above may be partially implemented using a system, a method, an integrated circuit, a computer program, or a computer-readable recording medium such as a CD-ROM, or any combination of systems, methods, integrated circuits, computer programs, or computer-readable recording media.

The present disclosure can achieve, for instance, a speech translation device which determines that speech recognition is difficult due to noise, for instance, and notifies a user of an action for overcoming the difficulty.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 5 illustrates an example of a configuration of the speech translation device according to Embodiment 1;

DETAILED DESCRIPTION OF THE EMBODIMENTS

Figure 1:
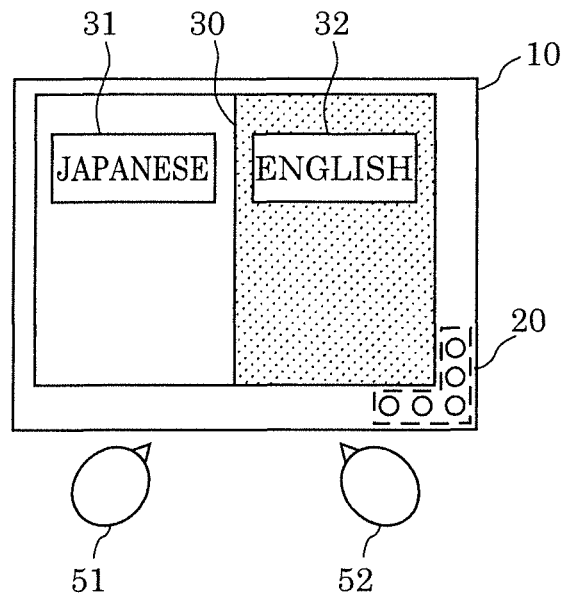
FIG. 1 illustrates an example of the external appearance of a speech translation device according to Embodiment 1.

A speech translation device according to an aspect of the present disclosure includes: a first beamformer which calculates first beamformer output which is a signal resulting from processing a speech signal obtained by a microphone array to direct a directivity for picking up sound in a first direction; a second beamformer which calculates second beamformer output which is a speech signal resulting from processing the speech signal obtained by the microphone array to direct the directivity for picking up sound in a second direction different from the first direction; a direction designator which designates, according to a user operation, one output among output from the first beamformer and output from the second beamformer; a first recognizer which recognizes content indicated by the first beamformer output as first content in a first language by performing, on the first beamformer output, recognition processing in the first language when the one output designated by the direction designator is a first beam formed by the first beamformer; a first translator which translates the first content recognized by the first recognizer into a second language; a second recognizer which recognizes content indicated by the second beamformer output as second content in the second language by performing, on the second beamformer output, recognition processing in the second language when the one output designated by the direction designator is a second beam formed by the second beamformer; a second translator which translates the second content recognized by the second recognizer into the first language; a signal-to-noise (SN) ratio calculator which calculates an SN ratio, using the one output designated by the direction designator as a signal component in the SN ratio, and the other output not designated by the direction designator among the output from the first beamformer and the output from the second beamformer, as a noise component in the SN ratio; a display determiner which determines, using the SN ratio calculated by the SN ratio calculator, whether recognition of the one output designated by the direction designator is difficult and determines, when the display determiner determines that the recognition is difficult, a speaking instruction for overcoming difficulty of the recognition, the speaking instruction being to be notified to a user; and a display which displays, in a display area, one of output from the first translator, output from the second translator, and the speaking instruction determined by the display determiner.

According to this configuration, it can be determined whether speech recognition is difficult, using an SN ratio, and if it is determined that speech recognition is difficult, a user can be notified of an instruction for appropriate speaking. Specifically, it can be determined that speech recognition is difficult due to noise, for instance, and the user can be notified of an action for overcoming the difficulty. Accordingly, speech can be correctly recognized, and correctly translated.

Here, for example, when the SN ratio is below a threshold, the display determiner may determine that the recognition is difficult, and determine an action for increasing the SN ratio to at least the threshold, as the speaking instruction.

Accordingly, the user can be notified of a speaking instruction which improves the SN ratio. Specifically, it can be determined that speech recognition is difficult due to noise, for instance, and the user can be notified of an action which improves the SN ratio, as the action for overcoming the difficulty.

For example, when the SN ratio is below the threshold and the action determined by the display determiner as the speaking instruction instructs the user to move closer to the microphone array and speak, the display determiner may switch, for input to one of the first recognizer and the second recognize which is to receive the one output designated by the direction designator, from the one output to output from the microphone array, and cause the speech signal obtained by the microphone array to be input to the one of the first recognizer and the second recognizer.

Accordingly, the performance of recognizing speech can be improved by notifying a user that he/she is to move closer to the microphone array and speak as the action for overcoming the difficulty and also by performing recognition processing and translating processing using the speech signal obtained by the microphone array as it is. Here, if the user speaks, being close to the microphone array, the performance of recognizing speech may deteriorate even if a beam is formed.

For example, the display determiner may further calculate a volume of the one output designated by the direction designator, and determine to display the volume calculated in the display area, and the display may further display a level meter indicating a level of the volume in the display area.

Accordingly, a user can speak while checking whether he/she is speaking at an appropriate level of the volume. Thus, the user can be prompted to speak at a level of a volume suitable for speech recognition processing, thus achieving further improvement in performance of recognizing speech.

For example, the display determiner may further determine to display the SN ratio calculated by the SN ratio calculator in the display area, and the display may further display a level meter indicating a level of the SN ratio in the display area.

Accordingly, a user can speak while checking whether he/she is speaking at an appropriate level of the SN ratio. Thus, the user can be prompted to speak at a level of an SN ratio suitable for speech recognition processing, thus achieving further improvement in performance of recognizing speech.

For example, the display determiner may further calculate a signal volume which is a volume of the one output designated by the direction designator, and a noise volume which is a volume of the speech signal obtained by the microphone array, and determine to display the signal volume calculated and the noise volume calculated in the display area, and the display may further display a level meter indicating a level of the signal volume and a level meter indicating a level of the noise volume in the display area.

Accordingly, a user can speak while checking whether he/she is speaking at an appropriate level of a signal volume and an appropriate level of a noise volume. Thus, the user can be prompted to speak at a level of a signal volume and a level of a noise volume which are suitable for speech recognition processing, thus achieving further improvement in performance of recognizing speech.

For example, the level indicated by the level meter may vary within a range from a lower threshold to an upper threshold when the display displays the level meter in the display area.

Accordingly, a user can be prompted to speak at a level suitable for speech recognition processing which is indicated by the level meter, thus achieving further improvement in performance of recognizing speech.

For example, the display may change a color of the level meter according to the level when the display displays the level meter.

Accordingly, a user can be prompted to speak at a level suitable for speech recognition processing which is indicated by the level meter, thus achieving further improvement in performance of recognizing speech.

For example, the display may further display a notification according to the level in the display area.

Accordingly, a user can be prompted to speak at a level suitable for speech recognition processing which is indicated by the level meter, thus achieving further improvement in performance of recognizing speech.

For example, the speech translation device may further include: a noise characteristic calculator which calculates noise characteristics, using one of the speech signal obtained by the microphone array and the one output designated by the direction designator. The display determiner may further determine whether the recognition of the one output is difficult, using the noise characteristics calculated by the noise characteristic calculator.

Accordingly, a user can be prompted to speak at a level suitable for speech recognition processing which is indicated by the level meter, thus achieving further improvement in performance of recognizing speech.

For example, the speech translation device may further include: a speech determiner which determines that a speech section includes the one output designated by the direction designator. The display determiner further determines whether the recognition of the one output is difficult, using the speech section determined by the speech determiner to include the one output.

Accordingly, the accuracy of determining whether speech recognition is difficult can be improved.

For example, the display determiner may further determine whether the user has made an erroneous operation, using the speech section determined by the speech determiner to include the one output.

Accordingly, the accuracy of determining whether speech recognition is difficult can be improved.

A speech translation device according to an aspect of the present disclosure includes: a first beamformer which calculates first beamformer output which is a signal resulting from processing a speech signal obtained by a microphone array to direct a directivity for picking up sound in a first direction; a second beamformer which calculates second beamformer output which is a speech signal resulting from processing the speech signal obtained by the microphone array to direct the directivity for picking up sound in a second direction different from the first direction; a direction designator which designates, according to a user operation, one output among output from the first beamformer and output from the second beamformer; a first recognizer which recognizes content indicated by the first beamformer output as first content in a first language by performing, on the first beamformer output, recognition processing in the first language when the one output designated by the direction designator is a first beam formed by the first beamformer; a first translator which translates the first content recognized by the first recognizer into a second language; a second recognizer which recognizes content indicated by the second beamformer output as second content in the second language by performing, on the second beamformer output, recognition processing in the second language when the one output designated by the direction designator is a second beam formed by the second beamformer; a second translator which translates the second content recognized by the second recognizer into the first language; a signal-to-noise (SN) ratio calculator which calculates an SN ratio, using the one output designated by the direction designator as a signal component in the SN ratio, and the other output not designated by the direction designator among the output from the first beamformer and the output from the second beamformer, as a noise component in the SN ratio; a display determiner which determines whether a user has made an erroneous operation, based on designation by the direction designator, a magnitude of the output from the first beamformer, and a magnitude of the output from the second beamformer, and determines, when the display determiner determines that the user has made an erroneous operation, a speaking instruction for correcting the erroneous operation, the speaking instruction being to be notified to the user; and a display which displays, in a display area, one of the output from the first translator, the output from the second translator, and the speaking instruction determined by the display determiner, according to a result of determination by the display determiner.

According to this configuration, it can be determined whether a user has made an erroneous operation, and the user can be notified of an instruction for appropriate speaking. Thus, when it is determined that the user has made an erroneous operation, the user can be notified of an action for correcting the erroneous operation. If the user has made an erroneous operation, it is highly likely that correct speech recognition, for instance, is difficult due to the user's erroneous operation, and thus correcting the erroneous operation allows speech to be correctly recognized and correctly translated.

A speech translation method according to an aspect of the present disclosure includes: (a) calculating first beamformer output which is a signal resulting from processing a speech signal obtained by a microphone array to direct a directivity for picking up sound in a first direction; (b) calculating second beamformer output which is a signal resulting from processing the speech signal obtained by the microphone array to direct the directivity for picking up sound in a second direction different from the first direction; (c) designating, according to a user operation, one output among output in (a) and output in (b); (d) recognizing content indicated by the first beamformer output as first content in a first language by performing, on the first beamformer output, recognition processing in the first language when the one output designated in (c) is a first beam formed in (a); (e) translating the first content recognized in (d) into a second language; (f) recognizing content indicated by the second beamformer output as second content in the second language by performing, on the second beamformer output, recognition processing in the second language when the one output designated in (c) is a second beam formed in (b); (g) translating the second content recognized in (f) into the first language; (h) calculating a signal-to-noise (SN) ratio, using the one output designated in (c) as a signal component in the SN ratio, and the other output not designated in (c) among the output in (a) and the output in (b), as a noise component in the SN ratio; (i) determining, using the SN ratio calculated in (h), whether recognition of the one output designated in (c) is difficult and determining, when the recognition is determined to be difficult, a speaking instruction for overcoming difficulty of the recognition, the speaking instruction being to be notified to a user; and (j) displaying, in a display area, one of output in (e), output in (g), and the speaking instruction determined in (i).

Accordingly, it is determined whether it is likely that speech can be correctly recognized, using the SN ratio, and when correct speech recognition, for instance, is difficult, a user can be notified of an instruction for appropriate speaking. Specifically, it can be determined that speech recognition is difficult due to noise, for instance, and the user can be notified of an action for overcoming the difficulty. As a result, speech can be correctly recognized and correctly translated.

A recording medium according to an aspect of the present disclosure is a non-transitory computer-readable recording medium having a program recorded thereon for causing a computer to execute: (a) calculating first beamformer output which is a signal resulting from processing a speech signal obtained by a microphone array to direct a directivity for picking up sound in a first direction; (b) calculating second beamformer output which is a signal resulting from processing the speech signal obtained by the microphone array to direct the directivity for picking up sound in a second direction different from the first direction; (c) designating, according to a user operation, one output among output in (a) and output in (b); (d) recognizing content indicated by the first beamformer output as first content in a first language by performing, on the first beamformer output, recognition processing in the first language when the one output designated in (c) is a first beam formed in (a); (e) translating the first content recognized in (d) into a second language; (f) recognizing content indicated by the second beamformer output as second content in the second language by performing, on the second beamformer output, recognition processing in the second language when the one output designated in (c) is a second beam formed in (b); (g) translating the second content recognized in (f) into the first language; (h) calculating a signal-to-noise (SN) ratio, using the one output designated in (c) as a signal component in the SN ratio, and the other output not designated in (c) among the output in (a) and the output in (b), as a noise component in the SN ratio; (i) determining, using the SN ratio calculated in (h), whether recognition of the one output designated in (c) is difficult and determining, when the recognition is determined to be difficult, a speaking instruction for overcoming difficulty of the recognition, the speaking instruction being to be notified to a user; and (j) displaying, in a display area, one of output in (e), output in (g), and the speaking instruction determined in (i).

Accordingly, it is determined whether it is likely that speech can be correctly recognized, using the SN ratio, and when correct speech recognition, for instance, is difficult, a user can be notified of an instruction for appropriate speaking. Specifically, it can be determined that speech recognition is difficult due to noise, for instance, and the user can be notified of an action for overcoming the difficulty. As a result, speech can be correctly recognized and correctly translated.

Note that some of the specific aspects may be implemented using a system, a method, an integrated circuit, a computer program, or a computer-readable recording medium such as a CD-ROM, or any combination of systems, methods, integrated circuits, computer programs or recording media.

The following specifically describes a speech translation device according to an aspect of the present disclosure with reference to the drawings. The embodiments described below each show a specific example of the present disclosure. The numerical values, shapes, materials, elements, and the arrangement of the elements, for instance, described in the following embodiments are mere examples, and thus are not intended to limit the present disclosure. Among the elements in the following embodiments, elements not recited in any of the independent claims defining the most generic part of the inventive concept are described as arbitrary elements. Features of the embodiments can be combined.

Embodiment 1

<Overview>

Figure 2:
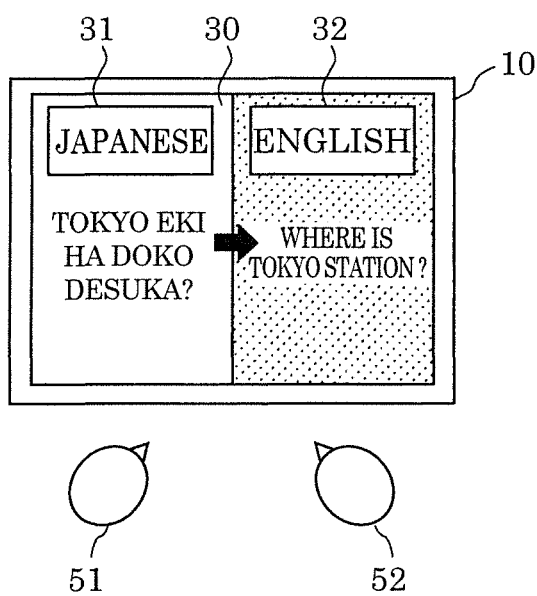
FIG. 2 illustrates an example of a situation in which the speech translation device according to Embodiment 1 is used.

FIG. 1 illustrates an example of the external appearance of speech translation device 10 according to Embodiment 1. FIG. 2 illustrates an example of a situation in which speech translation device 10 according to Embodiment 1 is used.

Speech translation device 10 translates a conversation between first speaker 51 of a first language, and second speaker 52 of a second language. Specifically, speech translation device 10 is used by two speakers of different languages, and translates the languages bidirectionally. Such speech translation device 10 has an elongated shape like a card, for example, and is achieved by a single mobile terminal such as a tablet terminal. As illustrated in FIG. 1, speech translation device 10 includes microphone array 20 which includes a plurality of microphones which obtain spoken words, and display area 30 which is for displaying a translation result in text.

FIG. 1 illustrates an example in which first speaker 51 of the first language that is Japanese is on the left, second speaker 52 of the second language that is English is on the right, and the speakers are having a conversation using speech translation device 10 side by side.

When first speaker 51 of Japanese speaks, first speaker 51 presses button 31 indicating "JAPANESE" and speaks. Here, for example, first speaker 51 says "TOKYO EKI HA DOKO DESUKA?" after pressing button 31 indicating "JAPANESE". In this case, as illustrated in FIG. 2, "TOKYO EKI HA DOKO DESUKA?" which is the result of the recognition of the Japanese words is displayed in the left region of display area 30, and "WHERE IS TOKYO STATION?" which is the result of translation into English by speech translation device 10 is displayed in the right region of display area 30.

Similarly, when second speaker 52 of English speaks, second speaker 52 presses button 32 indicating "ENGLISH" and speaks. Here, after pressing button 32 indicating "ENGLISH", second speaker 52 says "WHERE IS TOKYO STATION?", for example. In this case, as with the above, "WHERE IS TOKYO STATION?" which is the result of the recognition of the English words is displayed in the right region of display area 30, and "TOKYO EKI HA DOKO DESUKA?" which is the result of translation into Japanese by speech translation device 10 is displayed in the left region of display area 30.

Accordingly, speech translation device 10 switches between the first language and the second language to select a language into which spoken words are translated according to a user button operation, for instance.

Figure 3:
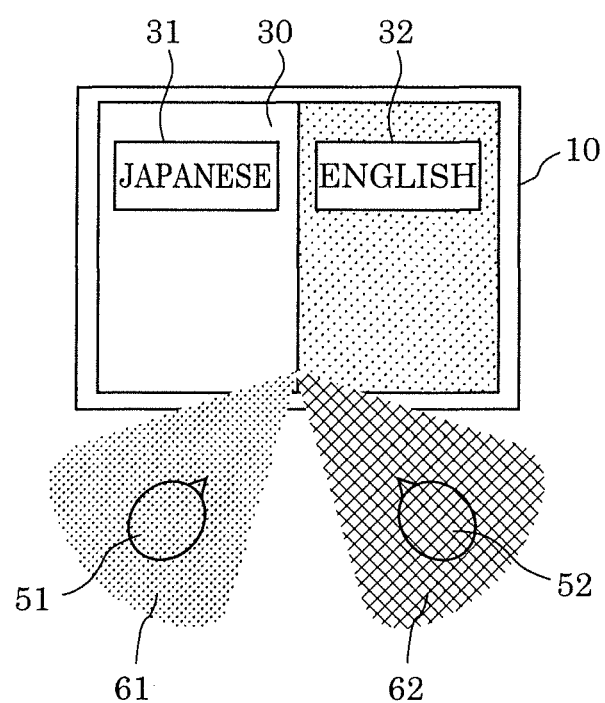
FIG. 3 illustrates sound pickup directions of the speech translation device according to Embodiment 1.

FIG. 3 illustrates sound pickup directions of speech translation device 10 according to Embodiment 1. The same numerals are given to the same elements as those in FIGS. 1 and 2.

When first speaker 51 presses button 31 indicating "JAPANESE" and speaks, the directivity for picking up sound is directed in sound pickup direction 61 which is a direction in which first speaker 51 is positioned when viewed from speech translation device 10. On the other hand, when second speaker 52 presses button 32 indicating "ENGLISH" and speaks, the directivity for picking up sound is directed in sound pickup direction 62 which is a direction in which second speaker 52 is positioned when viewed from speech translation device 10.

Thus, speech translation device 10 switches between sound pickup directions 61 and 62 which are different directions, in response to a user button operation, for instance. Here, sound pickup directions 61 and 62 are predetermined directions, and achieved by controlling the directivity of microphone array 20.

As described above, speech translation device 10 according to Embodiment 1 switches sound pickup directions and languages, in response to a user button operation, for instance.

Note that display area 30 included in speech translation device 10 according to Embodiment 1 has an elongated shape. Display area 30 is used in a vertical or horizontal orientation.

Figure 4A:
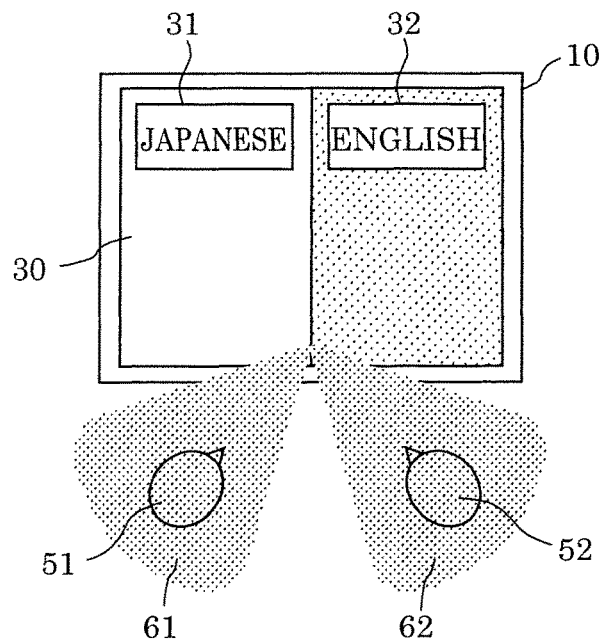
FIG. 4A illustrates a positional relationship of users using the speech translation device according to Embodiment 1.
Figure 4B:
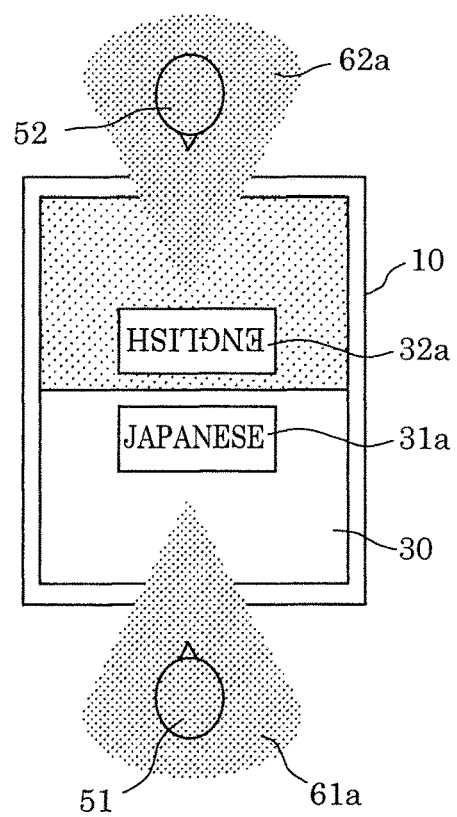
FIG. 4B illustrates a positional relationship of users using the speech translation device according to Embodiment 1.

FIGS. 4A and 4B illustrate the positional relationship of users of speech translation device 10 according to Embodiment 1. The same numerals are given to the same elements as those in FIGS. 1 and 2, and a detailed description thereof is omitted.

As illustrated in FIG. 4A, when users, namely first speaker 51 and second speaker 52 use speech translation device 10 side by side, the users use speech translation device 10 with display area 30 in the horizontal orientation. On the other hand, as illustrated in FIG. 4B, when users, namely first speaker 51 and second speaker 52 use speech translation device 10, facing each other, the users use speech translation device 10 with display area 30 in the vertical orientation. In this case, button 31a indicating "JAPANESE" is displayed towards first speaker 51, and button 32a indicating "ENGLISH" is displayed towards second speaker 52. Speech translation device 10 directs the directivity of microphone array 20 in sound pickup direction 61a for first speaker 51 and in sound pickup direction 62a for second speaker 52.

<Configuration of Device>

FIG. 5 illustrates an example of a configuration of speech translation device 10 according to Embodiment 1.

As illustrated in FIG. 5, speech translation device 10 includes beamformer 11, direction designator 12, display determiner 13, recognizer 14, translator 15, and display 16. Speech translation device 10 may further include microphone array 20. Stated differently, speech translation device 10 does not necessarily include microphone array 20.

[Microphone Array 20]

Microphone array 20 obtains a speech signal. More specifically, microphone array 20 includes two or more microphone units spaced apart from one another, collects speech, and obtains a speech signal which is an electrical signal resulting from being converted from the collected speech. Microphone array 20 outputs the obtained speech signal to beamformer 11. Note that microphone array 20 may be achieved as an adapter. In this case, microphone array 20 functions by being attached to speech translation device 10.

[Beamformer 11]

Beamformer 11 processes a speech signal obtained by microphone array 20, to direct the directivity for picking up sound in a predetermined direction, or in other words, to form a beam in a predetermined direction. Here, for example, as illustrated in FIG. 3, beamformer 11 processes a speech signal obtained by microphone array 20, to direct sound pickup direction 61 towards first speaker 51 or sound pickup direction 62 towards second speaker 52. Sound pickup directions 61 and 62 are different directions of formed beams.

In the present embodiment, as illustrated in FIG. 5, beamformer 11 includes first beamformer 111 and second beamformer 112.

First beamformer 111 processes a speech signal obtained by microphone array 20, to calculate first beamformer output which is a speech signal resulting from directing the directivity for picking up sound in the first direction, and form a first beam. Here, the first direction is a direction in which first speaker 51 is expected to be positioned when viewed from speech translation device 10. For example, in the example illustrated in FIG. 4A, or specifically, when first speaker 51 and second speaker 52 use speech translation device 10 side by side, the first direction is sound pickup direction 61. In the example illustrated in FIG. 4B, or specifically, when first speaker 51 and second speaker 52 use speech translation device 10, facing each other, the first direction is sound pickup direction 61a.

Second beamformer 112 processes a speech signal obtained by microphone array 20, to calculate second beamformer output which is a speech signal resulting from directing the directivity for picking up sound in the second direction different from the first direction, and form a second beam. Here, the second direction is a direction in which second speaker 52 is expected to be positioned when viewed from speech translation device 10. For example, in the example illustrated in FIG. 4A, or specifically, when first speaker 51 and second speaker 52 use speech translation device 10 side by side, the second direction is sound pickup direction 62. In the example illustrated in FIG. 4B, or specifically, when first speaker 51 and second speaker 52 use speech translation device 10, facing each other, the second direction is sound pickup direction 62.

[Direction Designator 12]

Direction designator 12 designates a method for controlling directivity for picking up sound by beamformer 11 and a language for recognizer 14 to recognize speech, according to a user operation. Direction designator 12 notifies display determiner 13 of the designated control method, that is, designation in detail.

For example, in the example illustrated in FIG. 3, if a user, namely first speaker 51 presses button 31 indicating "JAPANESE", the directivity for picking up sound by beamformer 11 is designated to be in sound pickup direction 61. Accordingly, the language for recognizer 14 to recognize speech is designated to be Japanese, and display determiner 13 is notified that the directivity is designated to be in sound pickup direction 61. On the other hand, if a user, namely second speaker 52 presses button 32 indicating "ENGLISH", the directivity for picking up sound by beamformer 11 is designated to be in sound pickup direction 62. Accordingly, the language for recognizer 14 to recognize speech is designated to be English, and display determiner 13 is notified that the directivity is designated to be in sound pickup direction 62.

In the present embodiment, direction designator 12 designates one of output from first beamformer 111 and output from second beamformer 112, according to a user operation. More specifically, direction designator 12 switches between output from first beamformer 111 and output from second beamformer 112, according to a user operation. This is because first beamformer 111 and second beamformer 112 constantly form a first beam and a second beam by each processing a speech signal obtained by microphone array 20.

In this manner, direction designator 12 allows one of a first beam formed by first beamformer 111 and a second beam formed by second beamformer 112 to be output to display determiner 13 and recognizer 14.

[Display Determiner 13]

Display determiner 13 determines whether a user has made an erroneous operation, based on designation by direction designator 12 according to a user operation and the magnitude of a speech signal (which indicates spoken words) obtained by picking up sound using a beam formed by beamformer 11. When display determiner 13 determines that a user has made an erroneous operation, display determiner 13 determines a speaking instruction for correcting an erroneous operation such as an instruction for a correct operation, and outputs the determined instruction to display 16.

In the present embodiment, display determiner 13 determines whether a user has made an erroneous operation, based on the designation by direction designator 12, the magnitude of the output from first beamformer 111, and the magnitude of the output from second beamformer 112.

For example, display determiner 13 determines that a user has made an erroneous operation if "the output from first beamformer 111>the output from second beamformer 112" when direction designator 12 has designated the output from second beamformer 112. Further, display determiner 13 determines that a user has made an erroneous operation if "the output from first beamformer 111<the output from second beamformer 112" when direction designator 12 has designated the output from first beamformer 111.

Here, a reason for determining that a user has made an erroneous operation is to be described with reference to FIG. 3. When the output from second beamformer 112 is designated according to a user operation, such a designation means that the user is second speaker 52 positioned in sound pickup direction 62, and is expected to speak the second language. However, when the output from first beamformer 111>the output from second beamformer 112, this means that the user is actually positioned in sound pickup direction 61 different from sound pickup direction 62 in which the user is expected to be positioned. These show that erroneous operations as below are made. Specifically, although the user is first speaker 51 of Japanese who wants to translate Japanese into English, the user accidentally pressed button 32 indicating "ENGLISH" and spoke. Alternatively although the user is second speaker 52 of English who wants to translate English into Japanese and is expected to be positioned in sound pickup direction 62, the user pressed button 32 indicating "ENGLISH" and spoke, being positioned in sound pickup direction 61.

Similarly, when the output from first beamformer 111 is designated according to a user operation, this means that the user is first speaker 51 positioned in sound pickup direction 61, and is expected to speak the first language. However, when the output from first beamformer 111<the output from second beamformer 112, this means that the user is actually positioned in sound pickup direction 62 different from sound pickup direction 61 in which the user is expected to be positioned. These show that erroneous operations as below are made. Specifically, although the user is second speaker 52 of English who wants to translate English into Japanese, the user accidentally pressed button 31 indicating "JAPANESE" and spoke. Alternatively, although the user is first speaker 51 of Japanese who wants to translate Japanese into English and is expected to be positioned in sound pickup direction 61, the user pressed button 31 indicating "JAPANESE" and spoke, being positioned in sound pickup direction 62.

In this manner, whether a used has made an erroneous operation can be determined.

When display determiner 13 determines that a user has made an erroneous operation, for example, display determiner 13 determines a speaking instruction for correcting the erroneous operation, which is to be notified to the user.

The speaking instruction herein indicates, for example, an instruction for a correct operation or a prompt for a user to speak again in a correct position. For example, if the output from second beamformer 112 is designated by direction designator 12 and "the output from first beamformer 111>the output from second beamformer 112", a speaking instruction that prompts a user to press button 31 indicating "JAPANESE" may be determined. For example, if the output from first beamformer 111 is designated by direction designator 12 and "the output from first beamformer 111<the output from second beamformer 112", a speaking instruction that prompts a user to press button 32 indicating "ENGLISH" may be determined.

[Recognizer 14]

Direction designator 12 designates the language for recognizer 14 to recognize the output from beamformer 11. Then, recognizer 14 recognizes the output from beamformer 11 in the designated language.

In the present embodiment, recognizer 14 includes first recognizer 141 and second recognizer 142 as illustrated in FIG. 5.

If one output designated by direction designator 12 is the first beam formed by first beamformer 111, first recognizer 141 recognizes the content indicated by the first beam as first content in the first language by performing, on the first beam, recognition processing in the first language. Here, the first language is a language that first speaker 51 is expected to speak, and is Japanese, for example. In the example illustrated in FIG. 4A, the first language is Japanese that first speaker 51 positioned in sound pickup direction 61 is expected to speak. In the example illustrated in FIG. 4B, the first language is Japanese that first speaker 51 positioned in sound pickup direction 61a is expected to speak.

When the one output designated by direction designator 12 is the second beam formed by second beamformer 112, second recognizer 142 recognizes the content indicated by the second beam as second content in the second language by performing, on the second beam, recognition processing in the second language. Here, the second language is a language that second speaker 52 is expected to speak, and is English, for example. In the example illustrated in FIG. 4A, the second language is English that second speaker 52 positioned in sound pickup direction 62 is expected to speak.

In the example illustrated in FIG. 4B, the second language is English that second speaker 52 positioned in sound pickup direction 62a is expected to speak.

[Translator 15]

Translator 15 translates the content recognized by recognizer 14, according to the language recognized by recognizer 14. Then, translator 15 outputs the translated content to display 16. For example, if the language recognized by recognizer 14 is Japanese, translator 15 translates the content recognized by recognizer 14 into English. On the other hand, if the language recognized by recognizer 14 is English, translator 15 translates the content recognized by recognizer 14 into Japanese.

In the present embodiment, translator 15 includes first translator 151 and second translator 152 as illustrated in FIG. 5.

First translator 151 translates first content recognized by first recognizer 141 into the second language. More specifically, first translator 151 translates content in Japanese which first recognizer 141 has recognized, into English. First translator 151 outputs the content translated into English to display 16.

Second translator 152 translates second content recognized by second recognizer 142 into the first language. More specifically, second translator 152 translates the content in English which second recognizer 142 has recognized into Japanese. Second translator 152 outputs the content translated into Japanese to display 16.

[Display 16]

Display 16 displays, in display area 30, one of the output from first translator 151, the output from second translator 152, and content determined by display determiner 13, according to the result of determination by display determiner 13.

More specifically, when display determiner 13 has determined that a user has not made an erroneous operation, display 16 displays first content translated by first translator 151 or second content translated by second translator 152. On the other hand, when display determiner 13 determines that a user has made an erroneous operation, display 16 displays a speaking instruction for correcting the erroneous operation, which is determined by display determiner 13.

Figure 6A:
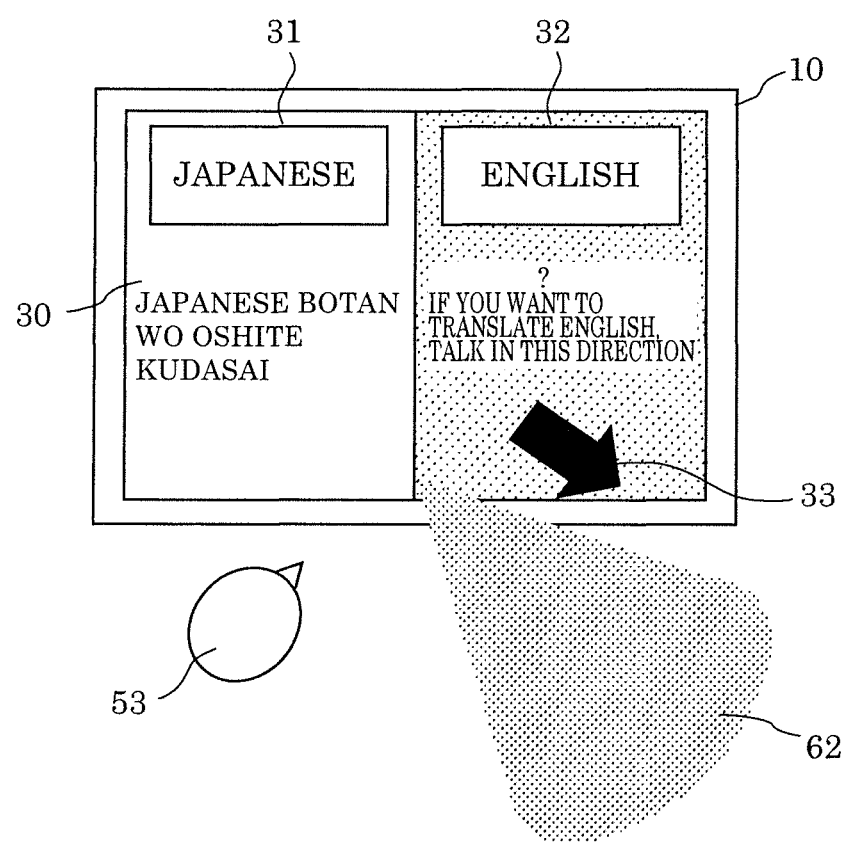
FIG. 6A illustrates an example of a speaking instruction for correcting an erroneous operation of a user, which is displayed by a display according to Embodiment 1.
Figure 6B:
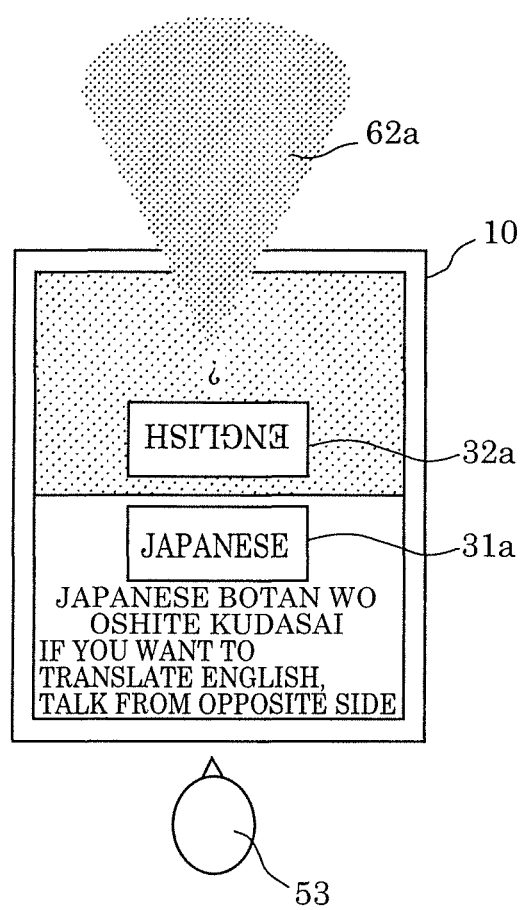
FIG. 6B illustrates an example of a speaking instruction for correcting an erroneous operation of a user, which is displayed by the display according to Embodiment 1.

FIGS. 6A and 6B illustrate an example of a speaking instruction for correcting a user's erroneous operation displayed by display 16 in Embodiment 1. The same signs are given to elements the same as those in FIGS. 1 to 4B.

FIG. 6A illustrates an example of a speaking instruction in the case where display area 30 is used in a horizontal orientation, when speaker 53 pressed button 32 indicating "ENGLISH" and spoke, but nevertheless, it is determined that the user has made an erroneous operation. In this case, display 16 displays a message or a notification that indicates a speaking instruction for correcting the erroneous operation, which is determined by display determiner 13. In FIG. 6A, "JAPANESE BOTAN WO OSHITE KUDASAI" is displayed in the left region of display area 30, and "IF YOU WANT TO TRANSLATE ENGLISH, TALK IN THIS DIRECTION" and a message that prompts the user to move in the direction of arrow 33 are displayed in the right region of display area 30.

FIG. 6B illustrates an example of a speaking instruction in the case where display area 30 is used in a vertical orientation, when speaker 53 pressed button 32 indicating "ENGLISH" and spoke, but nevertheless it is determined that the user has made an erroneous operation. In this case also, display 16 displays a speaking instruction for correcting the erroneous operation, which is determined by display determiner 13. In FIG. 6B, "JAPANESE BOTAN WO OSHITE KUDASAI" and a message which shows "IF YOU WANT TO TRANSLATE ENGLISH, TALK FROM OPPOSITE SIDE" to prompt the user to move to the opposite side of display area 30 are displayed in the lower area of display area 30.

Accordingly, display 16 simultaneously displays notifications (messages) in the first language and the second language in display area 30, as the speaking instruction for correcting an erroneous operation, which is determined by display determiner 13. Accordingly, speaker 53 is informed of an instruction for a correct operation by reading a notification in his/her language.

[Advantageous Effects]

As described above, speech translation device 10 according to the present embodiment determines whether a user has made an erroneous operation, and notifies the user of an instruction for appropriate speaking. Thus, when it is determined whether a user has made an erroneous operation, the user can be notified of an action for correcting the erroneous operation. If the user has made an erroneous operation, it is highly likely that the user's erroneous operation makes it difficult to appropriately recognize speech, for instance, and thus correcting the erroneous operation allows speech translation device 10 to correctly recognize speech and correctly translate the speech.

Embodiment 2

In Embodiment 1, it is highly likely that a user's erroneous operation makes it difficult to appropriately recognize speech, and thus when a user has made an erroneous operation, the user is notified of a speaking instruction for prompting the user to take an action for correcting the erroneous operation. Embodiment 2 describes that when speech recognition is difficult due to noise, for instance, a user is notified of a speaking instruction for prompting the user to take an action for overcoming the difficulty. The following mainly describes differences from Embodiment 1.

Figure 7:
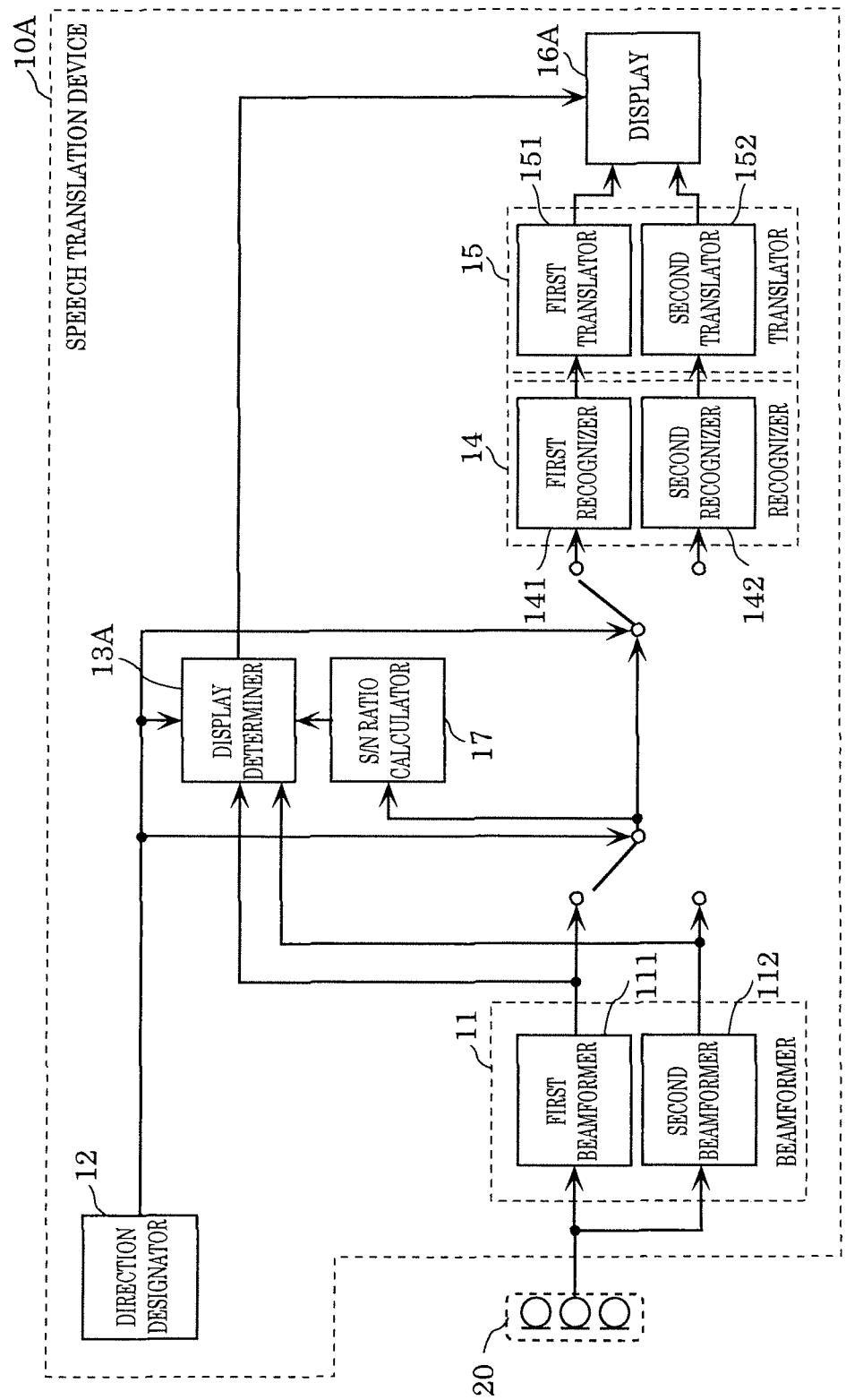
FIG. 7 illustrates an example of a configuration of a speech translation device according to Embodiment 2.

FIG. 7 illustrates an example of a configuration of speech translation device 10A according to Embodiment 2. The same signs are given to elements the same as those in FIG. 5, and a detailed description thereof is omitted.

Speech translation device 10A is different from speech translation device 10 according to Embodiment 1 in the configurations of display determiner 13A and display 16A, and additionally includes S/N ratio calculator 17.

[S/N Ratio Calculator 17]

S/N ratio calculator 17 calculates a signal-to-noise (SN) ratio, using a speech signal obtained by picking up sound using a beam formed by beamformer 11. In the present embodiment, S/N ratio calculator 17 calculates an SN ratio, using one output designated by direction designator 12 as a signal component in the SN ratio, and the other output not designated by direction designator 12 as a noise component.

[Display Determiner 13A]

Display determiner 13A determines whether speech recognition of words spoken by a user is difficult, based on the SN ratio calculated by S/N ratio calculator 17. When display determiner 13A determines that speech recognition is difficult, display determiner 13A determines a speaking instruction for prompting the user to take an action for overcoming the difficulty, and outputs the determined instruction to display 16A.

In the present embodiment, display determiner 13A determines whether recognition of the one output designated by direction designator 12 is difficult, using the SN ratio calculated by S/N ratio calculator 17. When display determiner 13 determines that recognition of the designated one output is difficult, display determiner 13 determines a speaking instruction for correcting the difficulty, which is to be notified to a user.

For example, display determiner 13A determines that speech recognition is difficult if the SN ratio calculated by S/N ratio calculator 17 is below a threshold, and determines an action for increasing the SN ratio to at least the threshold, as a speaking instruction. Specifically, display determiner 13A determines, as a speaking instruction, an action (action in detail) that prompts a user to take to inhibit the influence of noise exerted on speech recognition and that increases the SN ratio to at least the threshold. For example, display determiner 13A determines an action in detail that prompts a user to speak again near microphone array 20, to speak again in a louder voice, to speak in a quiet place, or to speak in a location away from a noise source, for instance.

Note that display determiner 13A may further determine whether a user has made an erroneous operation. The details of the method for determining whether a user has made an erroneous operation are as described in Embodiment 1, and thus a description thereof is omitted.

[Display 16A]

Display 16A displays, in display area 30, one of output from first translator 151, output from second translator 152, and a speaking instruction determined by display determiner 13A, according to the result of determination by display determiner 13A.

More specifically, when display determiner 13A determines that speech recognition is not difficult, display 16A displays first content that first translator 151 has translated or second content that second translator 152 has translated. On the other hand, when display determiner 13 determines that speech recognition is difficult, display 16A displays a speaking instruction for correcting the difficulty, which is determined by display determiner 13A.

FIGS. 8A to 8D illustrate examples of a speaking instruction displayed by display 16A according to Embodiment 2. The same signs are given to elements the same as those in FIGS. 1 to 4B. FIGS. 8A to 8D illustrate examples of message 34 illustrated as a speaking instruction when display area 30 is used in a horizontal orientation and it is determined that speech recognition of words spoken by first speaker 51 is difficult.

Figure 8A:
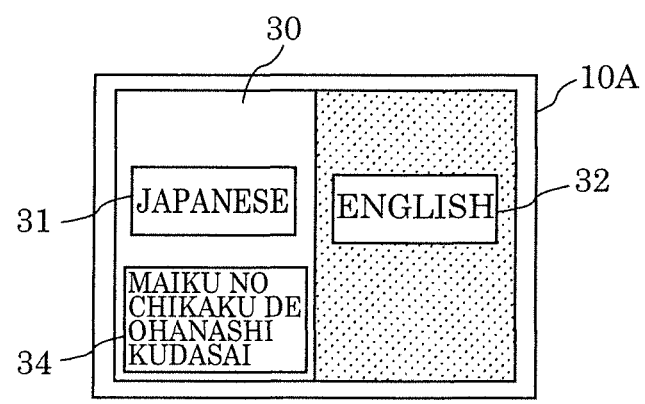
FIG. 8A illustrates an example of a speaking instruction displayed by a display according to Embodiment 2.
Figure 8B:
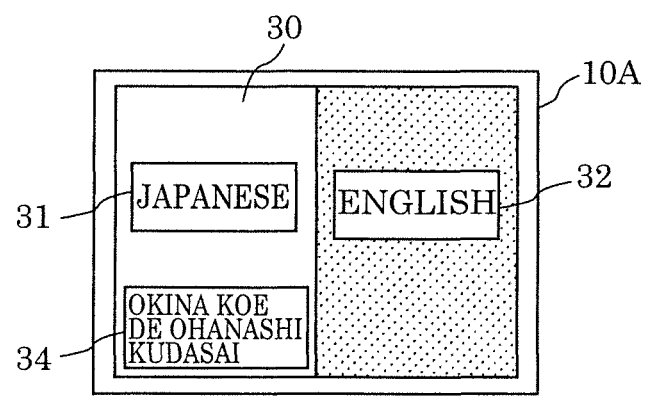
FIG. 8B illustrates an example of a speaking instruction displayed by the display according to Embodiment 2.
Figure 8C:
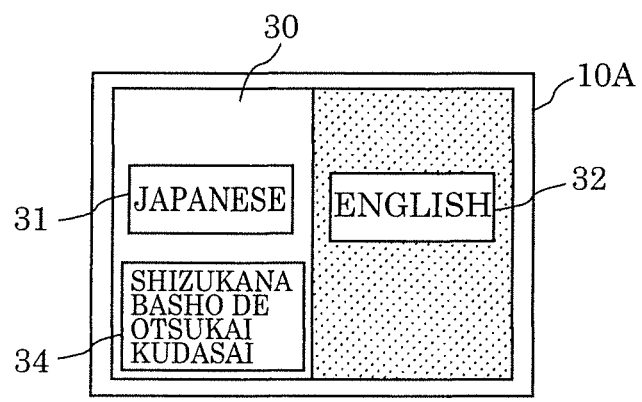
FIG. 8C illustrates an example of a speaking instruction displayed by the display according to Embodiment 2.
Figure 8D:
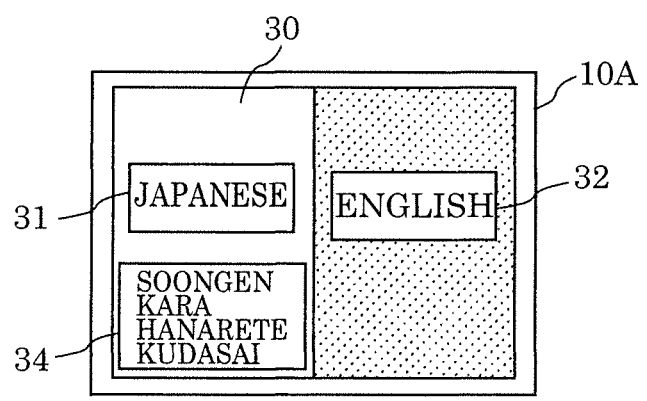
FIG. 8D illustrates an example of a speaking instruction displayed by the display according to Embodiment 2.

More specifically, as illustrated in FIG. 8A, message 34 indicating "MAIKU NO CHIKAKU DE OHANASHI KUDASAI" which prompts a user to take an action for increasing the SN ratio to at least the threshold may be displayed as a speaking instruction in a left region of display area 30. As illustrated in FIG. 8B, message 34 indicating "OKINA KOE DE OHANASHI KUDASAI" which prompts a user to take an action for increasing the SN ratio to at least the threshold may be displayed as a speaking instruction in the left region of display area 30. As illustrated in FIG. 8C, message 34 indicating "SHIZUKANA BASHO DE OTSUKAI KUDASAI" which prompts a user to take an action for increasing the SN ratio to at least the threshold may be displayed as a speaking instruction in the left region of display area 30. As illustrated in FIG. 8D, message 34 that indicates "SOONGEN KARA HANARETE KUDASAI" which prompts a user to take an action for increasing the SN ratio to at least the threshold may be displayed as a speaking instruction in the left region of display area 30. In any case, message 34 which prompts a user to take an action for increasing the SN ratio to at least the threshold may be displayed as a speaking instruction in the left region of display area 30. This prompts a user, namely first speaker 51 to take an action for inhibiting the influence of noise exerted on speech recognition and for increasing the SN ratio to at least the threshold.

FIGS. 9A to 9D illustrate other examples of a speaking instruction displayed by display 16A according to Embodiment 2. The same signs are given to elements the same as those in FIGS. 1 to 4B. FIGS. 9A to 9D illustrate examples of message 35 illustrated as a speaking instruction when display area 30 is used in a horizontal orientation and it is determined that speech recognition of words spoken by second speaker 52 is difficult.

Figure 9A:
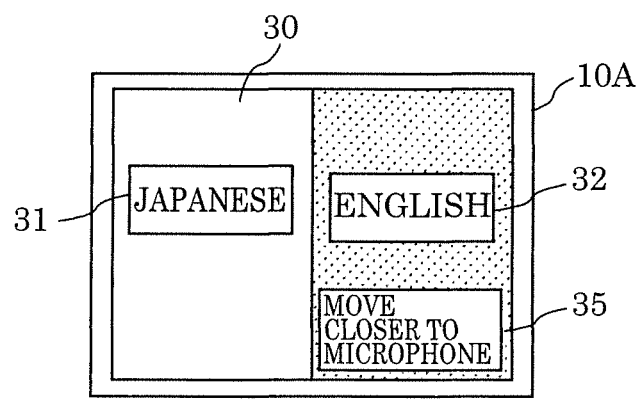
FIG. 9A illustrates another example of a speaking instruction displayed by the display according to Embodiment 2.
Figure 9B:
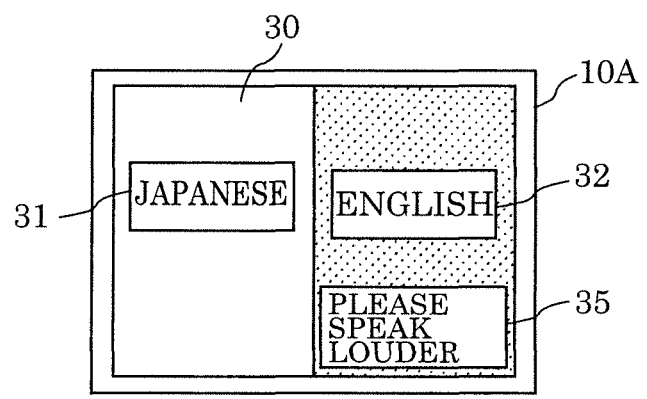
FIG. 9B illustrates another example of a speaking instruction displayed by the display according to Embodiment 2.
Figure 9C:
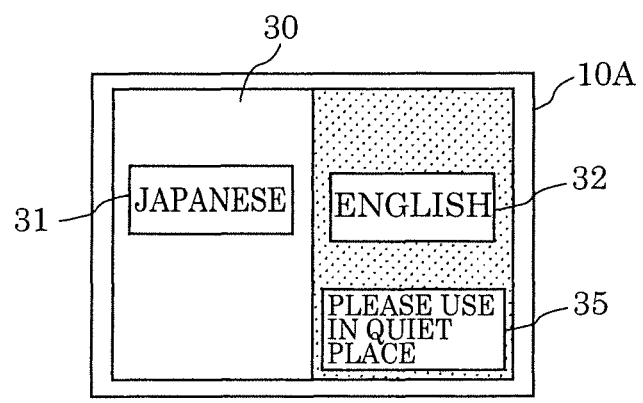
FIG. 9C illustrates another example of a speaking instruction displayed by the display according to Embodiment 2.
Figure 9D:
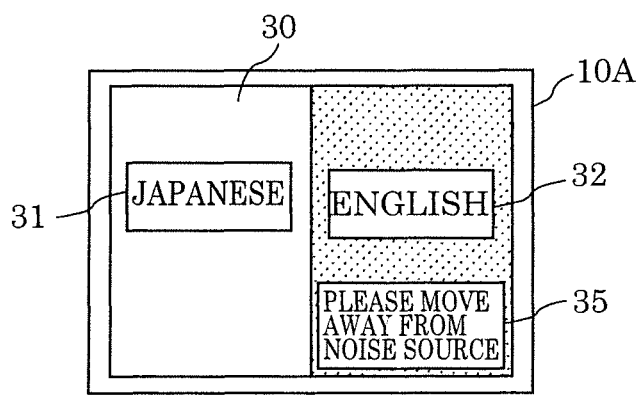
FIG. 9D illustrates another example of a speaking instruction displayed by the display according to Embodiment 2.

More specifically, as illustrated in FIG. 9A, message 35 indicating "MOVE CLOSER TO MICROPHONE" which prompts a user to take an action for increasing the SN ratio to at least the threshold may be displayed as a speaking instruction in the right region of display area 30. As illustrated in FIG. 9B, message 35 indicating "PLEASE SPEAK LOUDER" which prompts a user to take an action for increasing the SN ratio to at least the threshold may be displayed as a speaking instruction in the right region of display area 30. As illustrated in FIG. 9C, message 35 indicating "PLEASE USE IN QUIET PLACE" which prompts a user to take an action for increasing the SN ratio to the threshold may be displayed as a speaking instruction in the right region of display area 30. As illustrated in FIG. 9D, message 35 indicating "PLEASE MOVE AWAY FROM NOISE SOURCE" which prompts a user to take an action for increasing the SN ratio to at least the threshold may be displayed as a speaking instruction in the right region of display area 30. In any case, message 35 which prompts a user to take an action for increasing the SN ratio to at least the threshold may be displayed as a speaking instruction in the right region of display area 30. This prompts a user, namely second speaker 52 to take an action for inhibiting the influence of noise exerted on speech recognition and for increasing the SN ratio to at least the threshold.

In this manner, display 16 can notify a user of a speaking instruction in view of a situation in which speech recognition is difficult, and thus can prompt the user to take an action for overcoming the situation in which speech recognition is difficult.

Note that when display determiner 13A furthermore determines whether a user has made an erroneous operation, display 16A may display, in display area 30, a speaking instruction for correcting the erroneous operation, which is determined by display determiner 13A. The details of the display of a speaking instruction are as described in Embodiment 1, and thus a description thereof is omitted.

[Operation of Speech Translation Device 10A]

Operation processing performed by speech translation device 10A having the above configuration is to be described.

Figure 10:
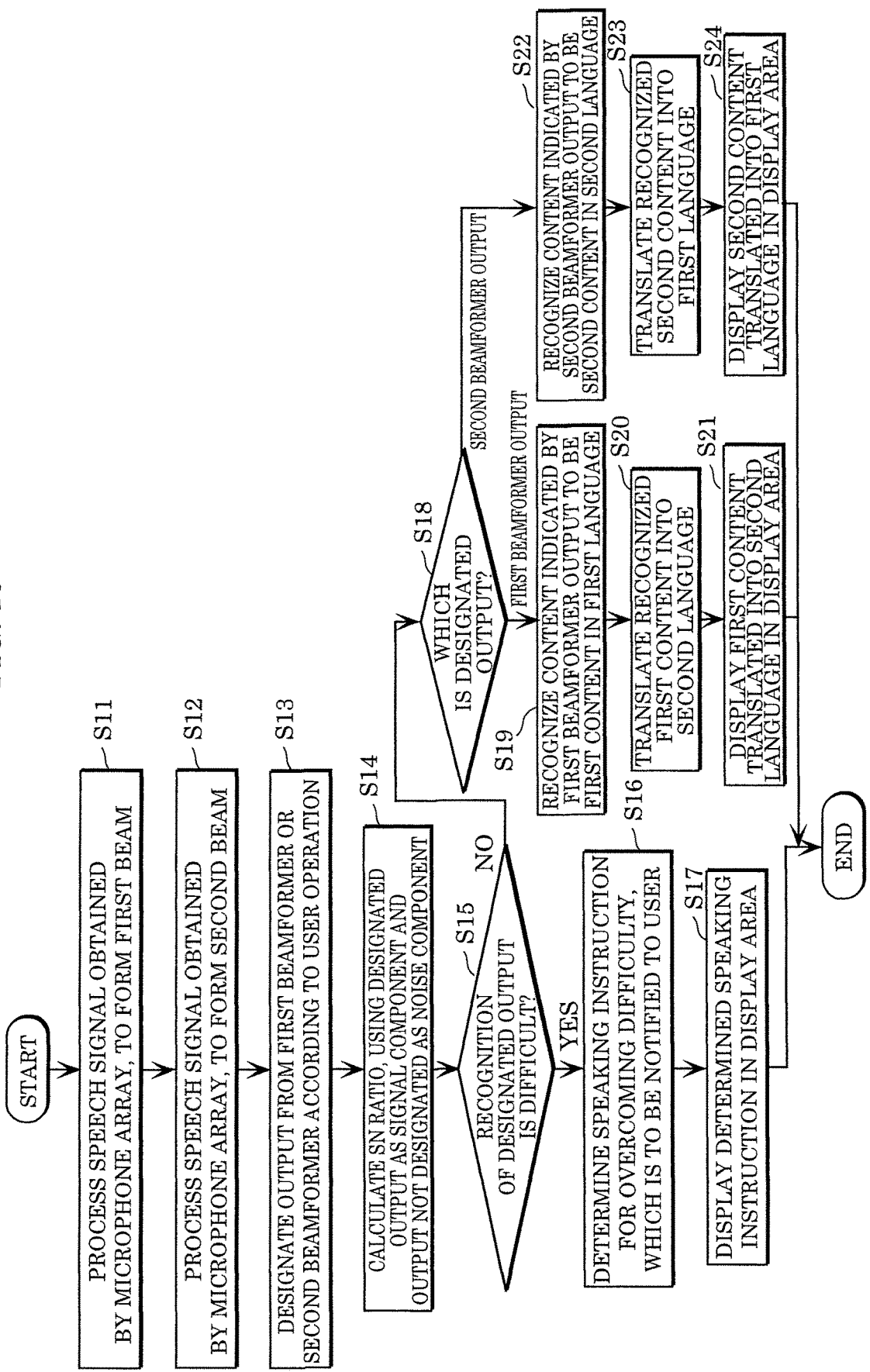
FIG. 10 is a flowchart illustrating operation processing performed by the speech translation device according to Embodiment 2.

FIG. 10 is a flowchart illustrating operation processing performed by speech translation device 10A according to Embodiment 2.

First, speech translation device 10A processes a speech signal obtained by microphone array 20 to form a first beam (S11). More specifically, speech translation device 10A processes a speech signal obtained by microphone array 20 to calculate first beamformer output which is a speech signal resulting from directing the directivity for picking up sound in the first direction, and to form a first beam.

Next, speech translation device 10A processes a speech signal obtained by microphone array 20 to form a second beam (S12). More specifically, speech translation device 10A processes a speech signal obtained by microphone array 20 to calculate second beamformer output which is a speech signal resulting from directing the directivity for picking up sound in a second direction different from the first direction, and to form a second beam.

Next, in speech translation device 10A, output from first beamformer 111 or second beamformer 112 is designated according to a user operation (S13). More specifically, in speech translation device 10A, a user operation designates one of output from first beamformer 111 and output from second beamformer 112.

Next, speech translation device 10A calculates an SN ratio, using the designated output as a signal component and the output not designated as a noise component (S14). More specifically, speech translation device 10A calculates an SN ratio, using the one output designated in step S13 as a signal component of the SN ratio, and the other output not designated in step S13 as a noise component.

Next, speech translation device 10A determines whether recognition of the designated output is difficult (S15). More specifically, speech translation device 10A determines whether recognition of the one output designated in step S13 is difficult, using the SN ratio calculated in step S14.

In step S15, when speech translation device 10A determines that recognition of the designated output is difficult (YES in S15), speech translation device 10A determines a speaking instruction for correcting the difficulty, which is to be notified to a user (S16). Then, speech translation device 10A displays the determined speaking instruction in display area 30 (S17).

On the other hand, when speech translation device 10A determines in step S15 that recognition of the designated output is not difficult (NO in S15), speech translation device 10A determines which output is the one output designated in step S13 (S18). If the one output designated in step S13 is first beamformer output (first beamformer output in S18), the processing proceeds to step S19. Note that if the one output designated in step S13 is second beamformer output (second beamformer output in S18), the processing proceeds to step S22.

In step S19, speech translation device 10A recognizes content indicated by the first beamformer output to be first content in the first language. More specifically, speech translation device 10A recognizes the content indicated by the first beamformer output to be the first content in the first language by performing recognition processing in the first language on the first beamformer output. Next, in step S20, speech translation device 10A translates the first content recognized in step S19 into the second language. Then, in step S21, speech translation device 10A displays the first content translated into the second language in display area 30.

On the other hand, in step S22, speech translation device 10A recognizes the content indicated by the second beamformer output to be second content in the second language. More specifically, speech translation device 10A recognizes the content indicated by the second beamformer output to be the second content in the second language by performing recognition processing in the second language on the second beamformer output. Next, in step S23, speech translation device 10A translates the second content recognized in step S22 into the first language. Then, in step S24, speech translation device 10A displays the second content translated into the first language in display area 30.

[Advantageous Effects]

As described above, speech translation device 10A according to the present embodiment determines, using the SN ratio, whether it is likely that speech can be correctly recognized, and when correct speech recognition is difficult, speech translation device 10A can notify a user of an instruction for appropriate speaking. Specifically, speech translation device 10A can determine that speech recognition is difficult due to noise, for instance, and can notify the user of an action for overcoming the difficulty. Accordingly, speech translation device 10A is allowed to correctly recognize speech, and correctly translate the speech.

Here, for example, if the SN ratio is below the threshold, speech translation device 10A may determine that speech recognition is difficult, and determine content which indicates a speaking instruction for increasing the SN ratio to at least the threshold, as a speaking instruction. Accordingly, a user can be notified of a speaking instruction which improves the SN ratio. Specifically, speech translation device 10A can determine that speech recognition is difficult due to noise, for instance, and can notify the user of an action which improves the SN ratio as an action for overcoming the difficulty. As a result, speech translation device 10A can prompt a user to take an action for overcoming the difficulty, thus being able to correctly recognize speech, and correctly translate the speech.

Variation 1

The following describes Variation 1. The following mainly describes differences from Embodiment 2.

Figure 11:
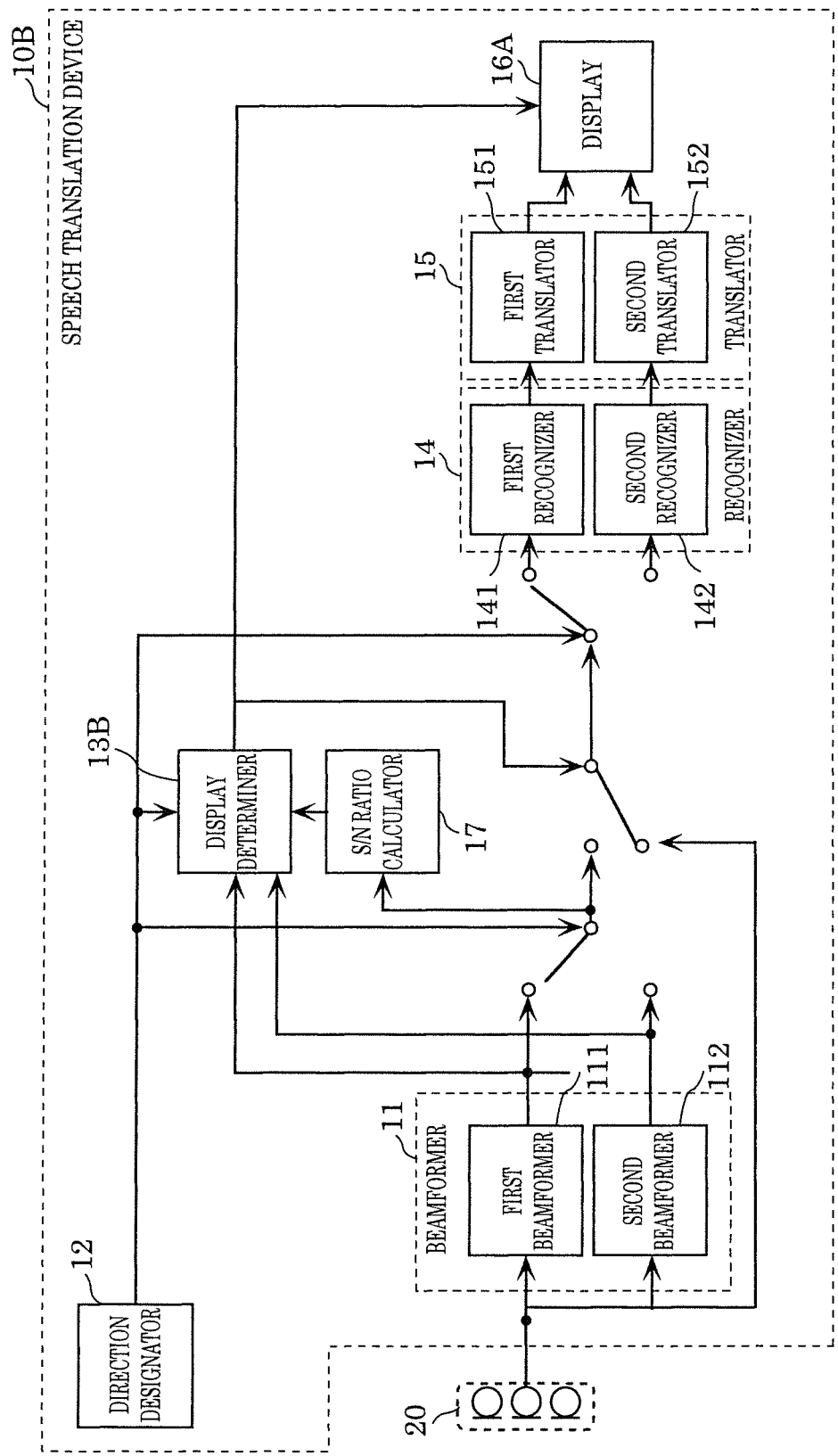
FIG. 11 illustrates an example of a configuration of a speech translation device according to Variation 1 of Embodiment 2.

FIG. 11 illustrates an example of a configuration of speech translation device 10B according to Variation 1 of Embodiment 2. The same signs are given to elements the same as those in FIG. 7, and a detailed description thereof is omitted.

Speech translation device 10B is different from speech translation device 10A illustrated in FIG. 7 in the configuration of display determiner 13B.

[Display Determiner 13B]

Display determiner 13B determines whether speech recognition of words spoken by a user is difficult based on an SN ratio calculated by S/N ratio calculator 17. When display determiner 13B determines that speech recognition is difficult, display determiner 13B determines a speaking instruction for prompting a user to take an action for overcoming the difficulty, and outputs the determined instruction to display 16A.

In this variation, display determiner 13B determines content which indicates that the SN ratio calculated by S/N ratio calculator 17 is below the threshold, and which instructs a user to move closer to a microphone array and speak as a speaking instruction. More specifically, display determiner 13B determines whether recognition of one output designated by direction designator 12 is difficult, according to whether the SN ratio calculated by S/N ratio calculator 17 is below the threshold. When display determiner 13 determines that recognition of the designated one output is difficult, display determiner 13 determines content which prompts a user to take an action, that is, to move closer to microphone array 20 and speak, as a speaking instruction for overcoming the difficulty.

In this case, display determiner 13B switches, for input to one of first recognizer 141 and second recognizer 142 which is to receive the one output designated by direction designator 12, from the designated one output to the output from microphone array 20. Display determiner 13B causes a speech signal obtained by microphone array 20 to be input to the one of first recognizer 141 or second recognizer 142.

Note that display determiner 13B may further determine whether a user has made an erroneous operation. Details of the method for determining whether a user has made an erroneous operation are as described in Embodiment 1, and thus a description thereof is omitted.

[Advantageous Effects]

As described above, speech translation device 10B according to the variation determines whether it is likely that speech can be correctly recognized, using the SN ratio, and if correct speech recognition is difficult, notifies the user that he/she is to move closer to microphone array 20 and speak, as an action that prompts a user to overcome the difficulty. Speech translation device 10B according to the present embodiment performs recognition processing and translating processing, using the speech signal obtained by microphone array 20 as it is, thus improving speech recognition performance for words spoken by a speaker. When a speaker speaks being close to microphone array 20, if the position of the speaker is closer to microphone array 20 than a range suitable for forming a beam, a desired speech is not correctly obtained and modified, so that speech recognition performance may deteriorate than in the case where no processing is performed.

Variation 2

Embodiment 2 and Variation 1 thereof have described a speaking instruction which prompts a user to take an action for overcoming the difficulty when speech recognition is difficult due to noise, for instance, yet the present disclosure is not limited to this. The speech translation device may provide display which prompts a user to take an action which does not cause difficulty in speech recognition even in a noisy environment, for instance, while the user is speaking. The following describes, as Variation 2, an example of display which prompts a user to take an action which does not cause difficulty in speech recognition, while the user is speaking.

First, the case where display 16A displays a level meter which indicates the level of the volume of a beam formed by beamformer 11 is described as an example of display which prompts a user to take an action which does not cause difficulty in speech recognition, while the user is speaking. Accordingly, display determiners 13A and 13B may further calculate the volume of one output designated by direction designator 12, and determine to display the calculated volume in display area 30. Then, display 16A may further display a level meter which indicates the level of the volume in display area 30.

Figure 12A:
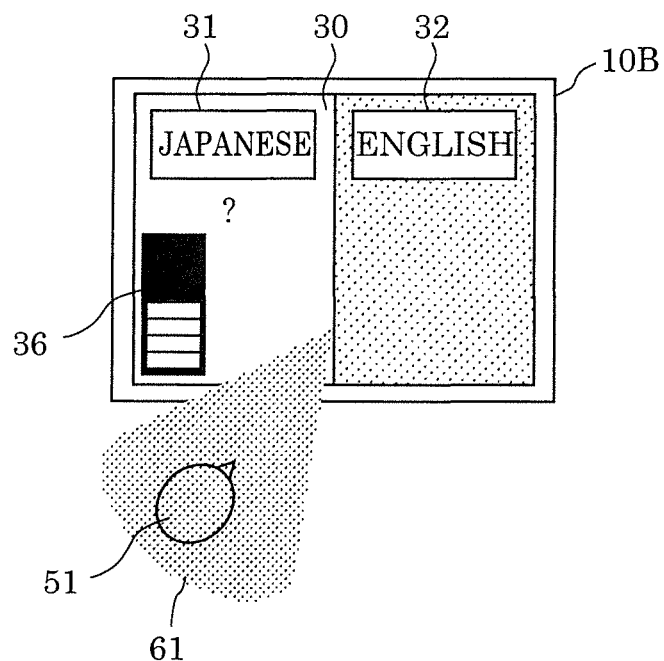
FIG. 12A illustrates an example of a level meter displayed by a display according to Variation 2 of Embodiment 2.
Figure 12B:
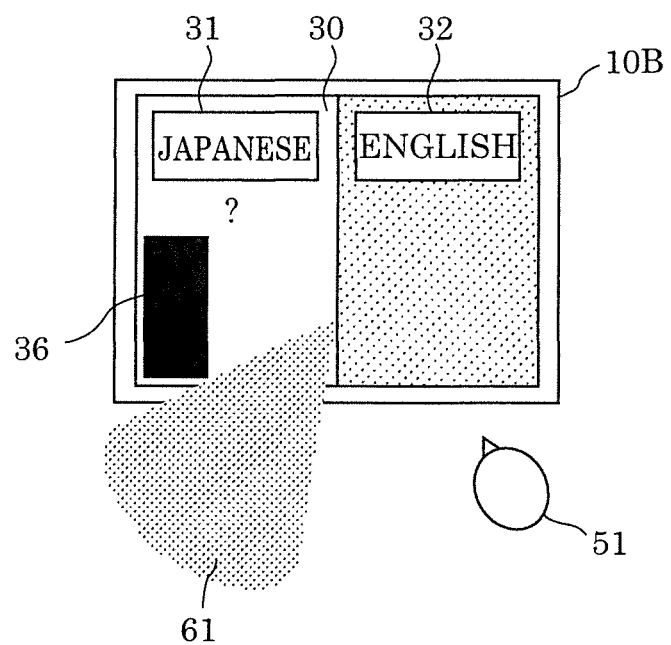
FIG. 12B illustrates an example of the level meter displayed by the display according to Variation 2 of Embodiment 2.

FIGS. 12A and 12B illustrate examples of the level meter displayed by display 16A according to Variation 2 of Embodiment 2. The same signs are given to elements the same as those in FIG. 3, for instance, and a detailed description thereof is omitted. As illustrated in FIGS. 12A and 12B, level meter 36 indicating the level of the volume of a beam formed by beamformer 11 is displayed in display area 30. Level meter 36 increases and decreases the volume level according to the volume of spoken words in the sound pickup direction.

More specifically, FIG. 12A illustrates a state where the volume level of level meter 36 increases and decreases when first speaker 51 presses button 31 indicating "JAPANESE" and speaks, being positioned in sound pickup direction 61. It can be seen that first speaker 51 is speaking being positioned in sound pickup direction 61 which is a correct location, by looking at an increase and a decrease in the volume level indicated by level meter 36. First speaker 51 can check whether he/she is speaking at an appropriate volume by looking at an increase and decrease in the volume level indicated by level meter 36. Accordingly, this prompts first speaker 51 to speak at a volume suitable for recognition processing by recognizer 14, thus improving recognition performance of recognizer 14.

On the other hand, FIG. 12B illustrates a state where the volume level indicated by level meter 36 does not react (indicates zero) when first speaker 51 presses button 31 indicating "JAPANESE" and speaks, not being positioned in sound pickup direction 61. Accordingly, first speaker 51 is informed that he/she is not speaking in a correct position, by looking at the volume level of level meter 36 that shows no reaction. Accordingly, this prompts first speaker 51 to move to sound pickup direction 61 which is a correct position and speak, and thus can be prompted to take an action which does not cause difficulty in speech recognition.

Note that the case where first speaker 51 uses speech translation devices 10A and 10B is described with reference to FIGS. 12A and 12B, but the present disclosure is not limited to this. Second speaker 52 may use speech translation devices 10A and 10B, and a similar description applies.

The following describes the case where display 16A displays a level meter which indicates the level of an S/N ratio calculated by S/N ratio calculator 17, as an example of display that prompts a user to take an action which does not cause difficulty in speech recognition, while the user is speaking. Specifically, display determiners 13A and 13B may determine to display an SN ratio calculated by S/N ratio calculator 17 in display area 30. Then, display 16A may display a level meter which indicates the level of the SN ratio in display area 30.

Figure 13A:
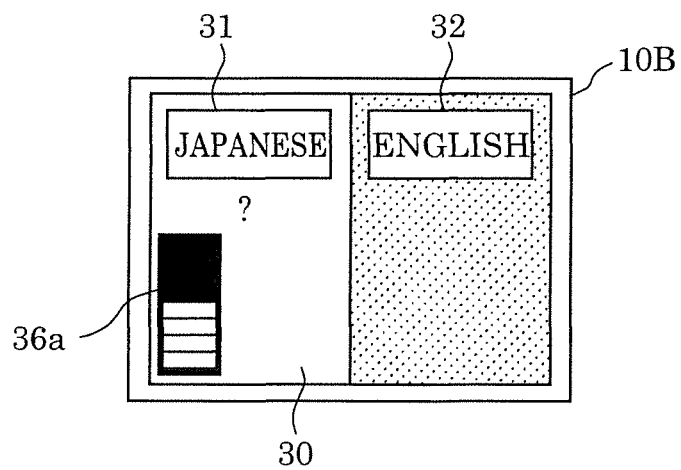
FIG. 13A illustrates another example of the level meter displayed by the display according to Variation 2 of Embodiment 2.
Figure 13B:
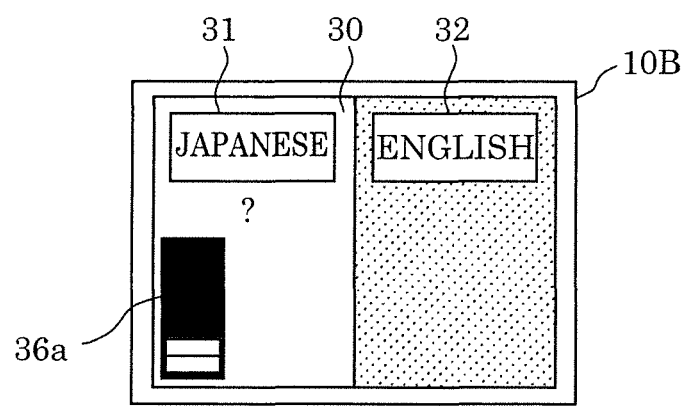
FIG. 13B illustrates another example of the level meter displayed by the display according to Variation 2 of Embodiment 2.

FIGS. 13A and 13B illustrate other examples of the level meter displayed by display 16A according to Variation 2 of Embodiment 2. As illustrated in FIGS. 13A and 13B, level meter 36a which indicates the level of the SN ratio calculated by S/N ratio calculator 17 is displayed in display area 30. Level meter 36a increases and decreases the volume level according the value of the calculated SN ratio.

More specifically, when the value of the calculated SN ratio is high, the level of the SN ratio indicated by level meter 36a is high as illustrated in FIG. 13A. On the other hand, if the value of the calculated SN ratio is low, the level of the SN ratio indicated by level meter 36a is low as illustrated in FIG. 13B. Accordingly, for example, a user such as first speaker 51 can check whether he/she is speaking at an appropriate volume, by looking at an increase and a decrease in the level of the SN ratio indicated by level meter 36a. Accordingly, this prompts the user to speak at a volume suitable for recognition processing by recognizer 14, and thus recognition performance of recognizer 14 can be improved.

Note that FIGS. 13A and 13B illustrate an example when the output from first beamformer 111 is calculated as a signal component in the SN ratio, yet the present disclosure is not limited to this. The output from second beamformer 112 may be calculated as a signal component in an SN ratio, and the same applies to this case.

The following describes the case where display 16A displays level meters which indicate a noise level and a signal level which can be calculated from beams formed by beamformer 11, as an example of display which prompts a user to take an action which does not cause difficulty in speech recognition, while the user is speaking. Specifically, display determiners 13A and 13B may further calculate, as a signal volume, the volume of one output designated by direction designator 12 among the output from first beamformer 111 and the output from second beamformer 112, and calculate the volume of a speech signal obtained by microphone array 20 as a noise volume. In this case, display determiners 13A and 13B may determine to display the calculated signal volume and the calculated noise volume in display area 30. Then, display 16A may further display level meters which indicate the level of the signal volume and the level of the noise volume in display area 30.

Figure 14A:
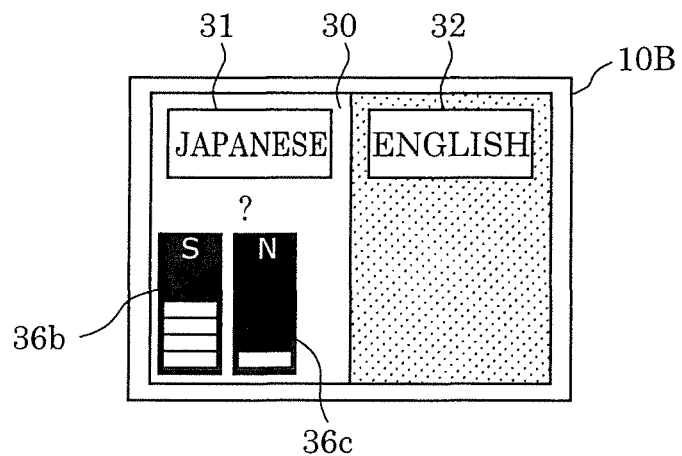
FIG. 14A illustrates yet other examples of level meters displayed by the display according to Variation 2 of Embodiment 2.
Figure 14B:
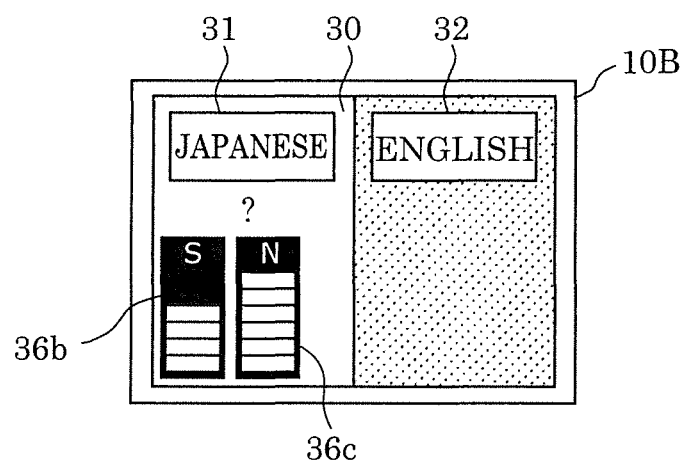
FIG. 14B illustrates yet other examples of the level meters displayed by the display according to Variation 2 of Embodiment 2.

FIGS. 14A and 14B illustrate yet other examples of the level meters displayed by display 16A according to Variation 2 of Embodiment 2. As illustrated in FIGS. 14A and 14B, level meter 36b indicating, as a level of a signal volume, the level of a volume of a beam formed by beamformer 11 is displayed in display area 30. Furthermore, level meter 36c indicating, as a level of a noise volume, the level of a volume of a speech signal obtained by microphone array 20 is displayed in display area 30.

More specifically, when first speaker 51 speaks at an appropriate volume in correct sound pickup direction 61, the level of a signal volume indicated by level meter 36b is higher than the level of the noise volume indicated by level meter 36c as illustrated in FIG. 14A. On the other hand, when first speaker 51 speaks at an inappropriate volume like in a small voice in correct sound pickup direction 61, the level of the signal volume indicated by level meter 36b is lower than the level of the noise volume indicated by level meter 36c as illustrated in FIG. 14B. Accordingly, a user such as first speaker 5 can check whether he/she is speaking at an appropriate volume by looking at and comparing level meters 36b and 36c. Accordingly, this prompts a user to speak at a volume suitable for recognition processing by recognizer 14, and thus recognition performance by recognizer 14 can be improved.

Note that the case where first speaker 51 uses speech translation devices 10A and 10B is described with reference to FIGS. 14A and 14B, yet the present disclosure is not limited to this. Second speaker 52 may use speech translation devices 10A and 10B, and the same applies to this case.

[Advantageous Effects]

As described above, speech translation devices 10A and 10B according to this variation can prompt a user to take an action which does not cause difficulty in speech recognition, while the user is speaking. More specifically, according to this variation, a user can speak, while checking whether he/she is speaking at an appropriate volume level, an appropriate SN ratio level, or appropriate levels of a signal volume and a noise volume. Accordingly, a user can be prompted to speak at the level of a volume, the level of an SN ratio, or the levels of a signal volume and a noise volume suitable for speech recognition processing, and thus speech recognition performance can be further improved.

Note that in the above, the calculated levels of the volume, the SN ratio, the signal volume, and the noise volume are displayed as they are using the level meters, yet the present disclosure is not limited to this. Display 16A may cause the level indicated by a level meter to vary within a range from the lower threshold to the upper threshold, and displays the level(s) in display area 30. Here, the lower threshold and the upper threshold are set in advance in consideration of the range of an appropriate level of a volume, for instance. Accordingly, a user can speak while intuitively checking whether he/she is speaking at an appropriate level of a volume, for instance. Examples in this case are described with reference to FIGS. 15A to 15C.

Figure 15A:
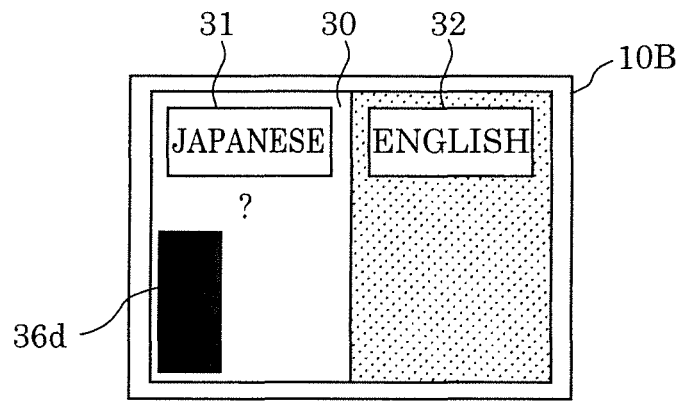
FIG. 15A illustrates an example of the level meter for which upper and lower range limits are set, and which is displayed by the display according to Variation 2 of Embodiment 2.
Figure 15B:
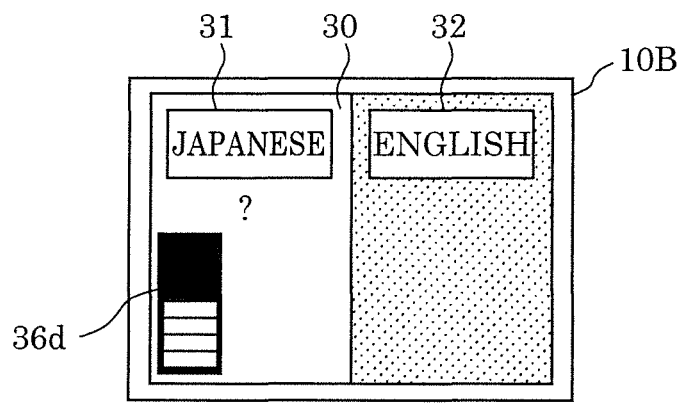
FIG. 15B illustrates an example of the level meter for which upper and lower range limits are set, and which is displayed by the display according to Variation 2 of Embodiment 2.
Figure 15C:
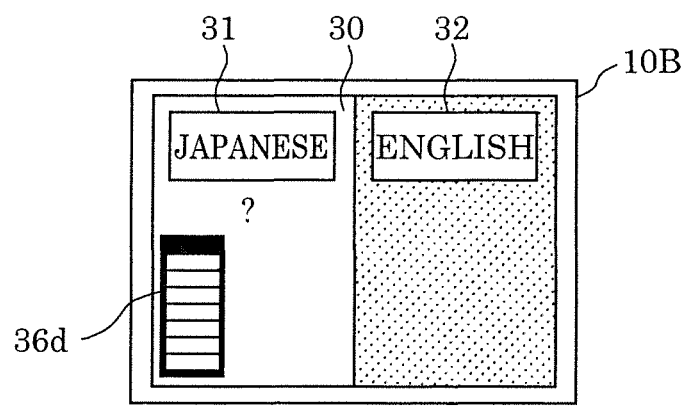
FIG. 15C illustrates an example of the level meter for which upper and lower range limits are set, and which is displayed by the display according to Variation 2 of Embodiment 2.

FIGS. 15A to 15C illustrate examples of level meter 36d for which upper and lower range limits are set and which is displayed by display 16A according to Variation 2 of Embodiment 2. More specifically, FIG. 15A illustrates a state where the level of a volume, for instance, indicated by level meter 36d gives no reaction when the level of the volume, for instance, is below the lower threshold set in advance. FIG. 15B illustrates a state where the level of a volume, for instance, indicated by level meter 36d increases/ decreases when the level of the volume, for instance, is above or equal to the lower threshold set in advance and below the upper threshold set in advance. FIG. 15C illustrates that the level of a volume, for instance, indicated by level meter 36d is at the maximum when the level of the volume, for instance, is above or equal to the upper threshold set in advance. Accordingly, a user such as first speaker 51, for example, can speak while intuitively checking whether he/she is speaking at an appropriate level of a volume, for instance, by looking at an increase/decrease in the level of a volume, for instance, indicated by level meter 36d for which upper and lower range limits are set.

Here, in FIGS. 15A to 15C, if the level indicated by a level meter varies within a range from the lower threshold to the upper threshold, the level of a volume, for instance, may be expressed not monotonously, but using different colors. Specifically, display 16A may change the color of a level meter according to, for instance, the magnitude of the level of a volume when display 16A displays the level meter. Examples in this case are described with reference to FIGS. 16A to 16C.

Figure 16A:
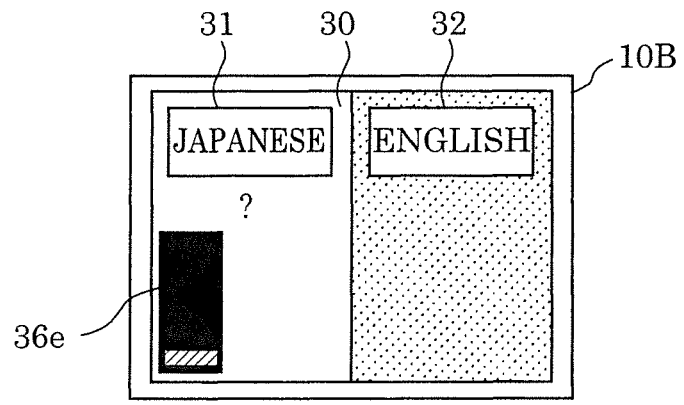
FIG. 16A illustrates an example of the level meter in which a color for a level of the volume, for instance, changes, for which upper and lower range limits are set, and which is displayed by the display according to Variation 2 of Embodiment 2.
Figure 16B:
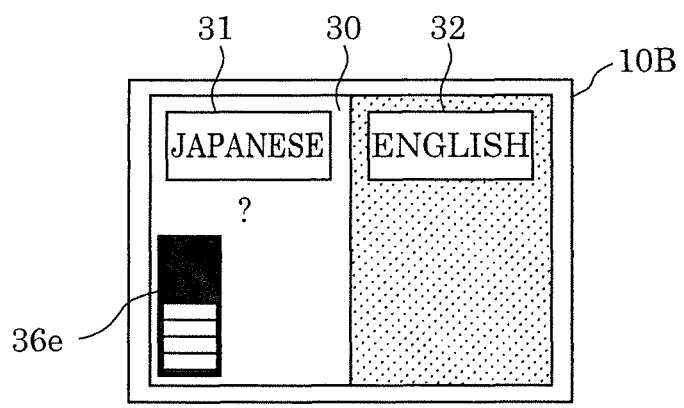
FIG. 16B illustrates an example of the level meter in which a color for a level of the volume, for instance, changes, for which upper and lower range limits are set, and which is displayed by the display according to Variation 2 of Embodiment 2.
Figure 16C:
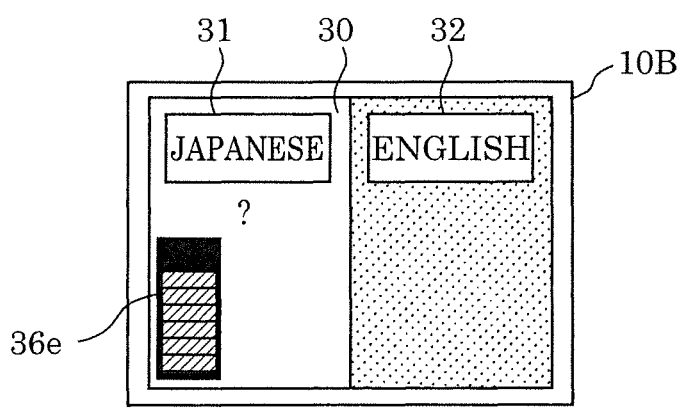
FIG. 16C illustrates an example of the level meter in which a color for a level of the volume, for instance, changes, for which upper and lower range limits are set, and which is displayed by the display according to Variation 2 of Embodiment 2.

FIGS. 16A to 16C illustrate examples of level meter 36e in which a color for a level of the volume, for instance, changes, for which upper and lower range limits are set, and which is displayed by display 16A according to Variation 2 of Embodiment 2. The same signs are given to elements the same as those in FIGS. 15A to 15C, and a detailed description thereof is omitted.

More specifically, in FIG. 16A, when the level of a volume, for instance, is below the lower threshold set in advance, the level of a volume, for instance, indicated by level meter 36e is expressed by one segment in an initial-level color such as red, for example. FIG. 16B illustrates a state where when the level of a volume, for instance, is above or equal to the lower threshold set in advance and below the upper threshold set in advance, the level of a volume, for instance, indicated by level meter 36e is expressed by an increase and decrease in segment in a color such as green that is other than the initial-level color, for example. FIG. 16C illustrates a state where when the level of a volume, for instance, is above or equal to the upper threshold set in advance, the level of a volume, for instance, indicated by level meter 36e is expressed by segments in a color such as red, for example, that is different from the color used for the level above or equal to the lower threshold and below the upper threshold. Accordingly, for example, a user such as first speaker 51 can speak while intuitively checking whether he/she is speaking at an appropriate level of a volume, for instance, by looking at the color for the level of a volume, for instance, indicated by level meter 36e for which upper and lower range limits are set.

In FIGS. 16A to 16C, a message which indicates a speaking instruction which prompts a user to take an action may be displayed in display area 30 when the level indicated by the level meter varies within a range from the lower threshold to the upper threshold and furthermore, is expressed using different colors. Thus, display 16A may further display a notification according to the level of a volume, for instance, in display area 30. Examples in this case are described with reference to FIGS. 17A to 17C.

Figure 17A:
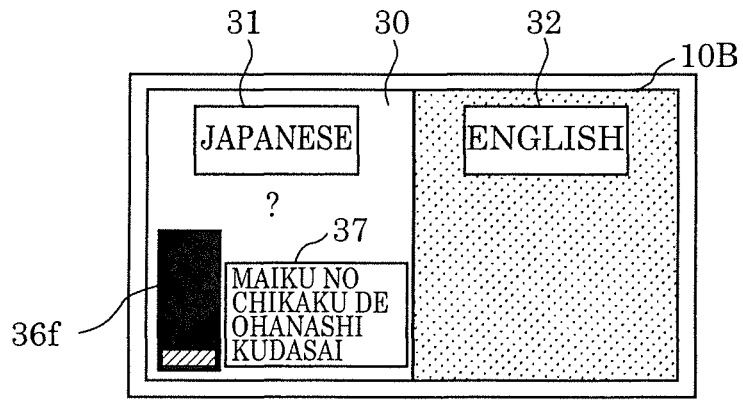
FIG. 17A illustrates an example of the level meter and an example of a message displayed by the display according to Variation 2 of Embodiment 2.
Figure 17B:
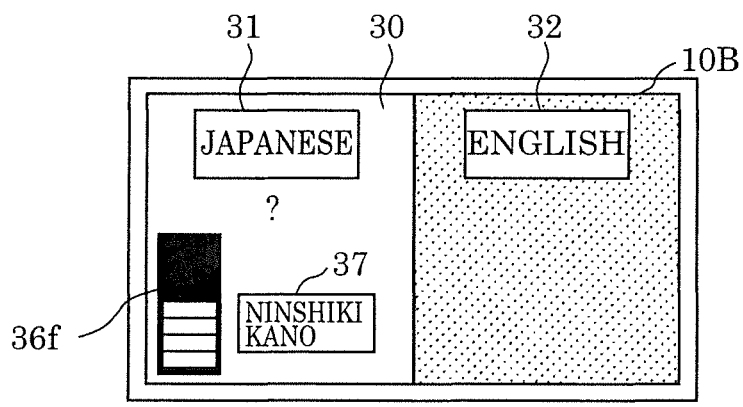
FIG. 17B illustrates an example of the level meter and an example of a message displayed by the display according to Variation 2 of Embodiment 2.
Figure 17C:
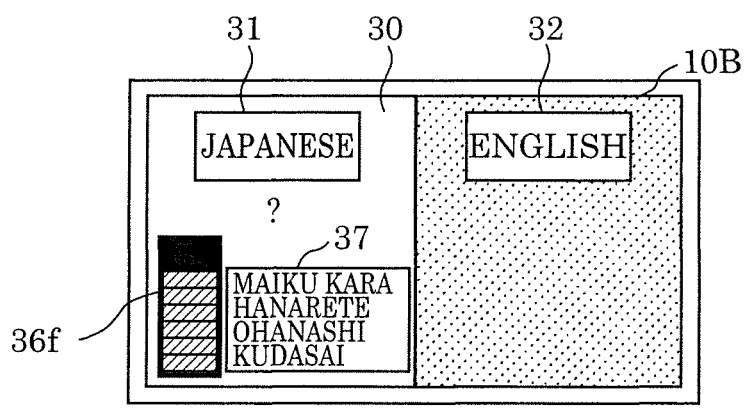
FIG. 17C illustrates an example of the level meter and an example of a message displayed by the display according to Variation 2 of Embodiment 2.

FIGS. 17A to 17C illustrate examples of level meter 36f and message 37 displayed by display 16A according to Variation 2 of Embodiment 2. The same signs are given to elements the same as those in FIGS. 16A to 16C, and a detailed description thereof is omitted.

More specifically, FIG. 17A illustrates that when the level of a volume, for instance, is below the lower threshold, the level of a volume, for instance, indicated by level meter 36f is expressed by one segment in an initial-level color, and also message 37 indicating "MAIKU NO CHIKAKU DE OHANASHI KUDASAI". FIG. 17B illustrates that when the level of a volume, for instance, is above or equal to the lower threshold and below the upper threshold, the level of a volume, for instance, indicated by level meter 36f is expressed by an increase and decrease in segment in a color other than the initial-level color, and also message 37 indicating "NINSHIKI KANO". FIG. 17C illustrates that when the level of a volume, for instance, is above or equal to the upper threshold, the level of a volume, for instance, indicated by level meter 36f is expressed by segments in a color different from the color for when the level of a volume, for instance, is above or equal to the lower threshold and below the upper threshold, and also illustrates message 37 indicating "MAIKU KARA HANARETE OHANASHI KUDASAI". Accordingly, for example, a user such as first speaker 51 can speak while checking whether he/she is speaking at an appropriate level of a volume, for instance, by not only looking at the color for the level of a volume, for instance, indicated by level meter 36f, but also checking message 37.

Variation 3

In Variation 1, it is determined using the SN ratio whether speech recognition is difficult, yet the present disclosure is not limited to this. The following gives a description focusing on differences from Variation 1.

Figure 18:
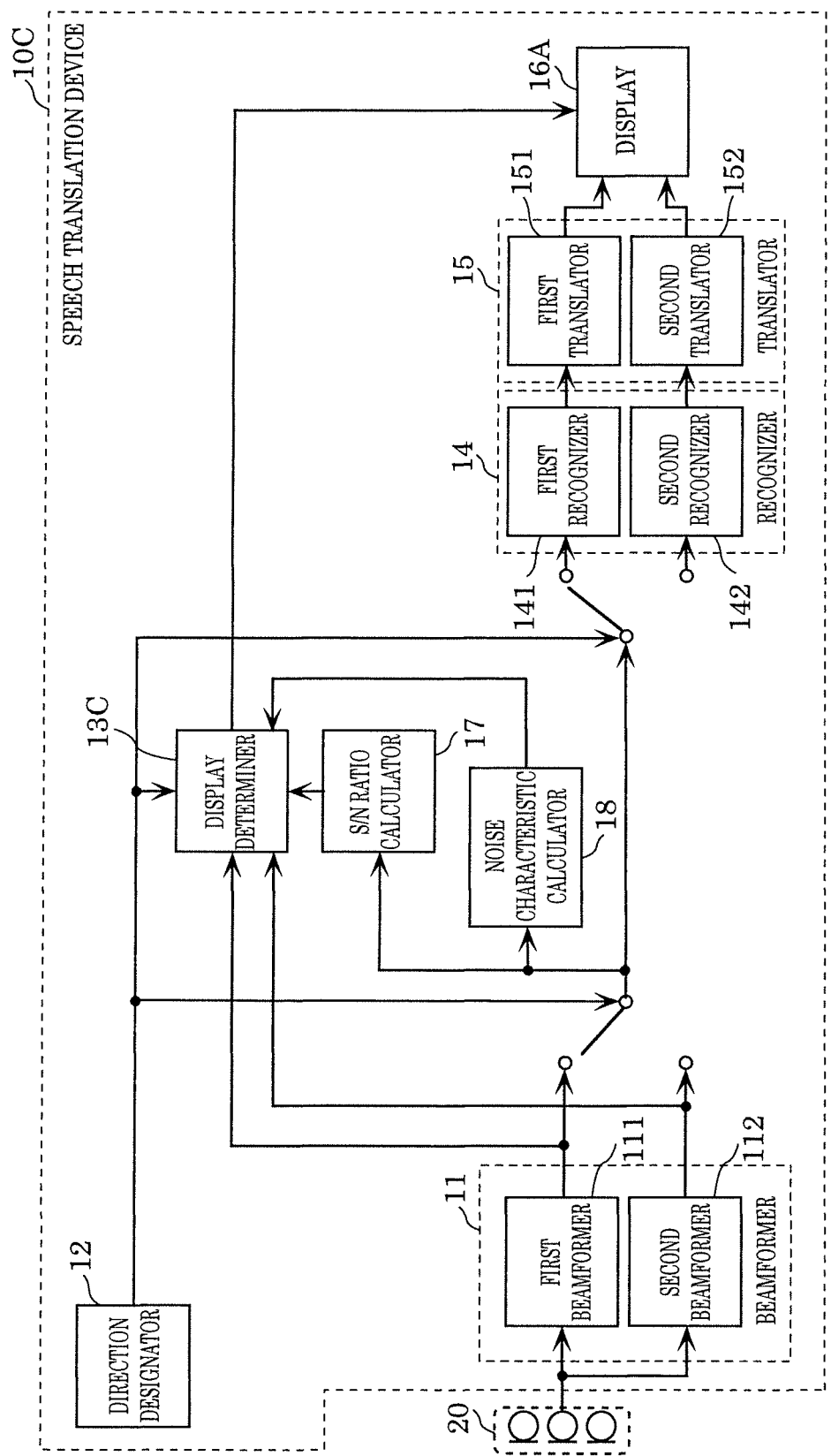
FIG. 18 illustrates an example of a configuration of a speech translation device according to Variation 3 of Embodiment 2.

FIG. 18 illustrates an example of a configuration of speech translation device 10C according to Variation 3 of Embodiment 2. The same signs are given to the elements same as those in FIG. 11, and a detailed description thereof is omitted.

Speech translation device 10C is different from speech translation device 10B illustrated in FIG. 7 in the configuration of display determiner 13C, and additionally includes noise characteristic calculator 18.

[Noise Characteristic Calculator 18]

Noise characteristic calculator 18 calculates noise characteristics using a speech signal obtained by picking up sound using a beam formed by beamformer 11. In this variation, noise characteristic calculator 18 calculates noise characteristics using a speech signal obtained by microphone array 20 or one output designated by direction designator 12.

For example, noise characteristic calculator 18 may calculate kurtosis as noise characteristics. Here, kurtosis is a statistics value indicating how sharp a frequency distribution of a signal is relative to the normal distribution, and is an index indicating a temporal change (stationarity/non-stationarity) of the signal. Kurtosis can be used as an index that indicates whether a temporal change in a speech signal obtained by microphone array 20 or a beam formed by beamformer 11 is small or large.

Noise characteristic calculator 18 may calculate a similarity with a speech model as noise characteristics. Noise characteristic calculator 18 uses a first beam or a second beam which is output not designated by direction designator 12, and calculates a similarity between a speech model and the output not designated. This similarity indicates speech-likeness. If a similarity with a speech model is higher, it is more likely that noise similar to a frequency component of speech (speech-likeness) is included, and thus speech recognition appears to be difficult.

[Display Determiner 13C]

Display determiner 13C further determines whether one output designated by direction designator 12 is difficult to be recognized, using noise characteristics calculated by noise characteristic calculator 18. When display determiner 13C determines, using noise characteristic, that speech recognition is difficult, display determiner 13C determines and outputs to display 16A a speaking instruction which prompts a user to take an action for overcoming the difficulty.

For example, noise characteristic calculator 18 calculates kurtosis as noise characteristics. In this case, display determiner 13C determines that speech recognition is difficult and determines a speaking instruction, if the kurtosis calculated by noise characteristic calculator 18 is greater than or equal to a threshold. Then, display determiner 13C outputs the determined speaking instruction to display 16A.

On the other hand, noise characteristic calculator 18 calculates a similarity with a speech model as noise characteristics. In this case, display determiner 13C determines that speech recognition is difficult and determines a speaking instruction, if a similarity with a speech model calculated by noise characteristic calculator 18 is above or equal to a threshold. Then, display determiner 13C may output the determined speaking instruction to display 16A.

Note that display determiner 13C may determine whether speech recognition of words spoken by a user is difficult, using an SN ratio calculated by S/N ratio calculator 17 and noise characteristics calculated by noise characteristic calculator 18. Further, display determiner 13C may also determine whether a user has made an erroneous operation. Since details of the method for determining whether a user has made an erroneous operation are as described in Embodiment 1, a description thereof is omitted.

[Advantageous Effects]

As described above, speech translation device 10C according to this variation can accurately determine whether speech recognition is difficult due to noise, using at least noise characteristics calculated by noise characteristic calculator 18. Specifically, the accuracy of determination as to whether speech recognition is difficult can be improved.

Accordingly, speech translation device 10C can accurately determine that speech recognition is difficult due to noise, for instance, and thus an action for overcoming the difficulty can be determined and notified to a user in a noisy situation in which speech recognition is difficult. Accordingly, speech can be correctly recognized, and correctly translated.

Variation 4

The following describes Variation 4. The following gives a description focusing on differences from Variation 3.

Figure 19:
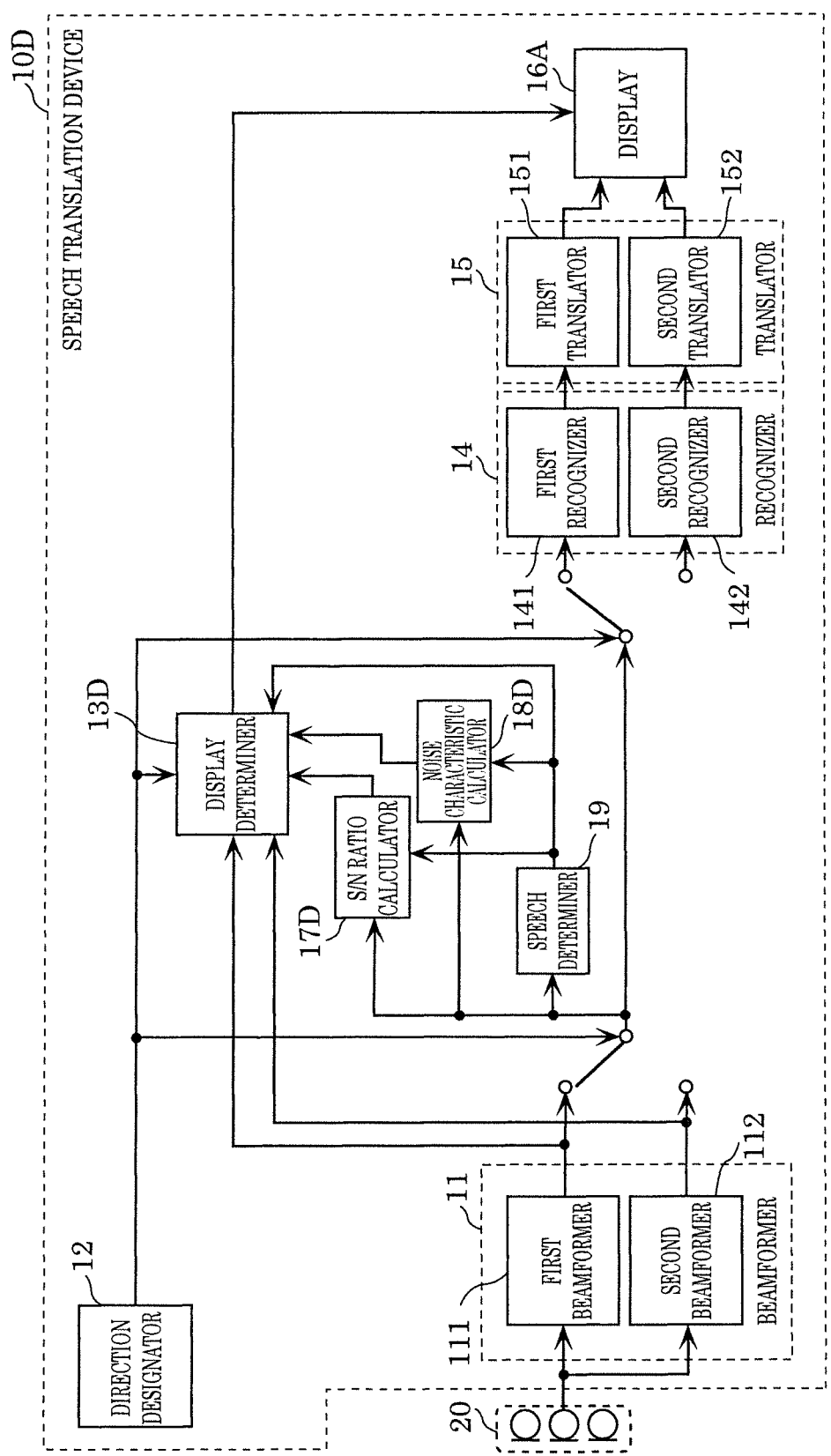
FIG. 19 illustrates an example of a configuration of a speech translation device according to Variation 4 of Embodiment 2.

FIG. 19 illustrates an example of a configuration of speech translation device 10D according to Variation 4 of Embodiment 2. The same signs are given to the elements same as those in FIGS. 11 and 18, and a detailed description thereof is omitted.

Speech translation device 10D is different from speech translation device 10C illustrated in FIG. 18 in the configurations of display determiner 13D, S/N ratio calculator 17D, and noise characteristic calculator 18D, and additionally includes speech determiner 19.

[Speech Determiner 19]

Speech determiner 19 determines whether a speech signal obtained by picking up sound using a beam formed by beamformer 11 indicates speech or non-speech that is other than speech, thus determining that a speech section includes the speech signal. In this variation, speech determiner 19 determines that a speech section includes one output designated by direction designator 12.

[S/N Ratio Calculator 17D]

S/N ratio calculator 17D calculates an SN ratio, using a speech signal determined by speech determiner 19 to be included in a speech section, among speech signals obtained by picking up sound using beams formed by beamformer 11. In this variation, S/N ratio calculator 17 calculates an SN ratio, using output determined by speech determiner 19 to be included in a speech section as a signal component in an SN ratio among outputs from one of the beamformers designated by direction designator 12, and output determined by speech determiner 19 to be included in a non-speech section among outputs from the designated one of the beamformers as a noise component.

[Noise Characteristic Calculator 18D]

Noise characteristic calculator 18D calculates noise characteristics using output determined by speech determiner 19 to be included in the non-speech section among speech signals obtained by picking up sound using beams formed by beamformer 11. In this variation, noise characteristic calculator 18D calculates noise characteristics using the output determined by speech determiner 19 to be included in the non-speech section among outputs from one of the beamformers designated by direction designator 12.

Here, as mentioned above, noise characteristics may be indicated by kurtosis or a similarity with a speech model. When noise characteristics are indicated by a similarity with a speech model, noise characteristic calculator 18 calculates a similarity between a speech model and output determined by speech determiner 19 to be included in the non-speech section among outputs from one of the beamformers designated by direction designator 12.

[Display Determiner 13D]

Display determiner 13D determines whether one output designated by direction designator 12 is difficult to be recognized, using a speech section determined by speech determiner 19 to include the one output. In this variation, display determiner 13D determines whether one output designated by direction designator 12 is difficult to be recognized, using noise characteristics calculated by noise characteristic calculator 18D. If display determiner 13D determines, using noise characteristics, that speech recognition is difficult, display determiner 13D determines a speaking instruction for prompting a user to take an action for overcoming the difficulty, and outputs the determined speaking instruction to display 16A.

Note that display determiner 13D may determine whether speech recognition of words spoken by a user is difficult, using an SN ratio calculated by S/N ratio calculator 17D and noise characteristics calculated by noise characteristic calculator 18. Display determiner 13D may determine whether a user has made an erroneous operation. Specifically, display determiner 13D may further determine whether a user operation is erroneously made, using a speech section which includes speech signals determined by speech determiner 19 to indicate speech. In this case, display determiner 13D may determine whether a user has made an erroneous operation, based on designation by direction designator 12 according to a user operation and the magnitude of a speech signal included in a speech section determined by speech determiner 19 among speech signals obtained by picking up sound using beams formed by beamformer 11. Since details of the method for determining whether a user has made an erroneous operation are as described in Embodiment 1, a description thereof is omitted.

[Advantageous Effects]

As described above, speech translation device 10D according to this variation can improve the accuracy of calculation of an SN ratio and noise characteristics, and thus can accurately determine whether speech recognition is difficult. Furthermore, speech translation device 10D according to this variation can accurately determine whether a user has made an erroneous operation.

The above has described, for instance, a speech translation device according to one or more aspects of the present disclosure, based on the embodiments and variations thereof, yet the present disclosure is not limited to such embodiments and variations. The scope of the present disclosure includes embodiments resulting from various modifications which may be conceived by those skilled in the art to the embodiments, or embodiments achieved by combining elements in different embodiments, as long as the modifications and combinations do not depart from the spirit of the present disclosure. For example, the cases as follows are also included in the present disclosure.

(1) The recognition processing by recognizer 14 and translating processing by translator 15 which are included in the above speech translation device may be performed by a cloud-based system. In this case, recognizer 14 and translator 15 may communicate with the cloud-based system, transmit target data to the cloud-based system, and obtain data subjected to recognition processing and translating processing.

(2) Although the above speech translation device, for instance, is described as being used as a tool for two speakers of different languages to communicate with each other and translating speech of one speaker into a language of the other speaker and vice versa, but the present disclosure is not limited to this. The above speech translation device may be used as a tool for a plurality of speakers of different languages to communicate one another. In this case, the beamformers may direct the sound pickup direction to regions allocated as regions in which the plurality of speakers surrounding display area 30 of the speech translation device are positioned. The speech of one speaker may be translated into the languages of other speakers, and may be displayed according to regions in which the other speakers are positioned.

(3) Specifically, the speech translation device, for instance, may be achieved by a computer system which includes a microprocessor, ROM, RAM, a hard disk unit, a display, a keyboard, a mouse, and the like. A computer program is stored in the RAM or the hard disk unit. The operation of the microprocessor in accordance with the computer program allows each element to achieve its functionality. Here, the computer program includes a combination of instruction codes indicating instructions to a computer in order to achieve predetermined functionality.

(4) Some or all of elements included in the speech translation device, for instance, described above may be achieved by a single system large scale integration (LSI: large scale integrated circuit). The system LSI is a super multi-function LSI manufactured by integrating multiple components in one chip, and is specifically a computer system configured so as to include a microprocessor, ROM, RAM, and so on. A computer program is stored in the RAM. The system LSI accomplishes its functionality by the microprocessor operating in accordance with the computer program.

(5) Some or all of elements included in the speech translation device, for instance, described above may be achieved by an IC card or a single module which can be attached to or detached from various devices. The IC card or the module is a computer system which includes a microprocessor, ROM, RAM, and the like. The above super-multifunctional LSI may be achieved by the IC card or the module. The IC card or the module accomplishes its functionality by the microprocessor operating in accordance with the computer program. The IC card or the module may have tamper resistant properties.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be used for a speech translation device, a speech translation method, and a recording medium therefor used as a tool for speakers of different languages to communicate with one another.

What is claimed is:
1. A speech translation device, comprising:
a memory configured to store a program; and
a processor configured to execute the program and control the speech translation device to function as:
a first beamformer which calculates first beamformer output which is a signal resulting from processing a speech signal obtained by a microphone array to direct a directivity for picking up sound in a first direction in which a first user is located;
a second beamformer which calculates second beamformer output which is a speech signal resulting from processing the speech signal obtained by the microphone array to direct the directivity for picking up sound in a second direction different from the first direction, the second direction being a direction in which a second user different from the first user is located;
a direction designator which designates, according to a user operation made by one of the first user and the second user, one output among output from the first beamformer and output from the second beamformer;
a first recognizer which recognizes content indicated by the first beamformer output as first content in a first language by performing, on the first beamformer output, recognition processing in the first language when the one output designated by the direction designator is a first beam formed by the first beamformer;
a first translator which translates the first content recognized by the first recognizer into a second language;
a second recognizer which recognizes content indicated by the second beamformer output as second content in the second language by performing, on the second beamformer output, recognition processing in the second language when the one output designated by the direction designator is a second beam formed by the second beamformer;
a second translator which translates the second content recognized by the second recognizer into the first language;
a signal-to-noise (SN) ratio calculator which calculates an SN ratio, using the one output designated by the direction designator as a signal component in the SN ratio, and the other output not designated by the direction designator among the output from the first beamformer and the output from the second beamformer, as a noise component in the SN ratio;

a display determiner which determines, using the SN ratio calculated by the SN ratio calculator, whether recognition of the one output designated by the direction designator is difficult and determines, when the display determiner determines that the recognition is difficult, a speaking instruction for overcoming difficulty of the recognition, the speaking instruction being to be notified to a user, the user being the one of the first user and the second user; and a display which displays, in a display area, one of output from the first translator, output from the second translator, and the speaking instruction determined by the display determiner, wherein when the SN ratio is below a threshold, the display determiner determines that the recognition is difficult, and determines an action for increasing the SN ratio to at least the threshold, as the speaking instruction, and when the SN ratio is below the threshold and the action determined by the display determiner as the speaking instruction instructs the user to move closer to the microphone array and speak, the display determiner switches, for input to one of the first recognizer and the second recognizer which is to receive the one output designated by the direction designator, from the one output to output from the microphone array, and causes the speech signal obtained by the microphone array to be input to the one of the first recognizer and the second recognizer.

2. The speech translation device according to claim 1, wherein
the display determiner further calculates a volume of the one output designated by the direction designator, and determines to display the volume calculated in the display area, and
the display further displays a level meter indicating a level of the volume in the display area.

3. The speech translation device according to claim 1, wherein
the display determiner further determines to display the SN ratio calculated by the SN ratio calculator in the display area, and
the display further displays a level meter indicating a level of the SN ratio in the display area.

4. The speech translation device according to claim 1, wherein
the display determiner further calculates a signal volume which is a volume of the one output designated by the direction designator, and a noise volume which is a volume of the speech signal obtained by the microphone array, and determines to display the signal volume calculated and the noise volume calculated in the display area, and
the display further displays a level meter indicating a level of the signal volume and a level meter indicating a level of the noise volume in the display area.

5. The speech translation device according to claim 2, wherein
the level indicated by the level meter varies within a range from a lower threshold to an upper threshold when the display displays the level meter in the display area.

6. The speech translation device according to claim 2, wherein
the display changes a color of the level meter according to the level when the display displays the level meter.

7. The speech translation device according to claim 2, wherein the display further displays a notification according to the level in the display area.

8. The speech translation device according to claim 1, wherein
the processor is further configured to execute the program and control the speech translation device to function as a noise characteristic calculator which calculates noise characteristics, using one of the speech signal obtained by the microphone array and the one output designated by the direction designator, and
the display determiner further determines whether the recognition of the one output is difficult, using the noise characteristics calculated by the noise characteristic calculator.

9. The speech translation device according to claim 1, wherein
the processor is further configured to execute the program and control the speech translation device to function as a speech determiner which determines that a speech section includes the one output designated by the direction designator, and
the display determiner further determines whether the recognition of the one output is difficult, using the speech section determined by the speech determiner to include the one output.

10. The speech translation device according to claim 9, wherein
the display determiner further determines whether the user has made an erroneous operation, using the speech section determined by the speech determiner to include the one output.

11. A speech translation device, comprising:
a memory configured to store a program; and
a processor configured to execute the program and control the speech translation device to function as:
a first beamformer which calculates first beamformer output which is a signal resulting from processing a speech signal obtained by a microphone array to direct a directivity for picking up sound in a first direction in which a first user is located;
a second beamformer which calculates second beamformer output which is a speech signal resulting from processing the speech signal obtained by the microphone array to direct the directivity for picking up sound in a second direction different from the first direction, the second direction being a direction in which a second user different from the first user is located;
a direction designator which designates, according to a user operation made by one of the first user and the second user, one output among output from the first beamformer and output from the second beamformer;
a first recognizer which recognizes content indicated by the first beamformer output as first content in a first language by performing, on the first beamformer output, recognition processing in the first language when the one output designated by the direction designator is a first beam formed by the first beamformer;
a first translator which translates the first content recognized by the first recognizer into a second language;
a second recognizer which recognizes content indicated by the second beamformer output as second content in the second language by performing, on the second beamformer output, recognition processing in the second language when the one output designated by the direction designator is a second beam formed by the second beamformer;

a second translator which translates the second content recognized by the second recognizer into the first language;
a signal-to-noise (SN) ratio calculator which calculates an SN ratio, using the one output designated by the direction designator as a signal component in the SN ratio, and the other output not designated by the direction designator among the output from the first beamformer and the output from the second beamformer, as a noise component in the SN ratio; and
a display determiner which determines whether a user has made an erroneous operation, based on designation by the direction designator, a magnitude of the output from the first beamformer, and a magnitude of the output from the second beamformer, and determines, when the display determiner determines that the user has made an erroneous operation, a first speaking instruction for correcting the erroneous operation, the first speaking instruction being to be notified to the user, the user being the one of the first user and the second user, wherein
when the SN ratio is below a threshold, the display determiner determines that recognition of the one output designated by the direction designator is difficult, and determines an action for increasing the SN ratio to at least the threshold, as a second speaking instruction to be notified to the user,
when the SN ratio is below the threshold and the action determined by the display determiner as the second speaking instruction instructs the user to move closer to the microphone array and speak, the display determiner switches, for input to one of the first recognizer and the second recognizer which is to receive the one output designated by the direction designator, from the one output to output from the microphone array, and causes the speech signal obtained by the microphone array to be input to the one of the first recognizer and the second recognizer, and
the speech translation device further comprises a display which displays, in a display area, one of the output from the first translator, the output from the second translator, the first speaking instruction determined by the display determiner, and the second speaking instruction determined by the display determiner, according to a result of determination by the display determiner.

12. A speech translation method, comprising:
(a) calculating first beamformer output which is a signal resulting from processing a speech signal obtained by a microphone array to direct a directivity for picking up sound in a first direction in which a first user is located;
(b) calculating second beamformer output which is a signal resulting from processing the speech signal obtained by the microphone array to direct the directivity for picking up sound in a second direction different from the first direction, the second direction being a direction in which a second user different from the first user is located;
(c) designating, according to a user operation made by one of the first user and the second user, one output among output in (a) and output in (b);
(d) recognizing content indicated by the first beamformer output as first content in a first language by performing, on the first beamformer output, recognition processing in the first language when the one output designated in (c) is a first beam formed in (a);
(e) translating the first content recognized in (d) into a second language;
(f) recognizing content indicated by the second beamformer output as second content in the second language by performing, on the second beamformer output, recognition processing in the second language when the one output designated in (c) is a second beam formed in (b);
(g) translating the second content recognized in (f) into the first language;
(h) calculating a signal-to-noise (SN) ratio, using the one output designated in (c) as a signal component in the SN ratio, and the other output not designated in (c) among the output in (a) and the output in (b), as a noise component in the SN ratio;
(i) determining, using the SN ratio calculated in (h), whether recognition of the one output designated in (c) is difficult and determining, when the recognition is determined to be difficult, a speaking instruction for overcoming difficulty of the recognition, the speaking instruction being to be notified to a user, the user being the one of the first user and the second user; and
(j) displaying, in a display area, one of output in (e), output in (g), and the speaking instruction determined in (i), wherein
when the SN ratio is below a threshold, the recognition is determined to be difficult, and an action for increasing the SN ratio to at least the threshold is determined as the speaking instruction, and
when the SN ratio is below the threshold and the action determined as the speaking instruction instructs the user to move closer to the microphone array and speak, the method further comprises switching from the one output designated in (c) to output from the microphone array, and causing the speech signal obtained by the microphone array to be input as the first content recognized in (d) or the second content recognized in (f).

13. A non-transitory computer-readable recording medium having a program recorded thereon for causing a computer to execute:
(a) calculating first beamformer output which is a signal resulting from processing a speech signal obtained by a microphone array to direct a directivity for picking up sound in a first direction in which a first user is located;
(b) calculating second beamformer output which is a signal resulting from processing the speech signal obtained by the microphone array to direct the directivity for picking up sound in a second direction different from the first direction, the second direction being a direction in which a second user different from the first user is located;
(c) designating, according to a user operation made by one of the first user and the second user, one output among output in (a) and output in (b);
(d) recognizing content indicated by the first beamformer output as first content in a first language by performing, on the first beamformer output, recognition processing in the first language when the one output designated in (c) is a first beam formed in (a);
(e) translating the first content recognized in (d) into a second language;
(f) recognizing content indicated by the second beamformer output as second content in the second language by performing, on the second beamformer output, recognition processing in the second language when the one output designated in (c) is a second beam formed in (b);
(g) translating the second content recognized in (f) into the first language;

(h) calculating a signal-to-noise (SN) ratio, using the one output designated in (c) as a signal component in the SN ratio, and the other output not designated in (c) among the output in (a) and the output in (b), as a noise component in the SN ratio;

(i) determining, using the SN ratio calculated in (h), whether recognition of the one output designated in (c) is difficult and determining, when the recognition is determined to be difficult, a speaking instruction for overcoming difficulty of the recognition, the speaking instruction being to be notified to a user, the user being the one of the first user and the second user; and (j) displaying, in a display area, one of output in (e), output in (g), and the speaking instruction determined in (i), wherein when the SN ratio is below a threshold, the recognition is determined to be difficult, and an action for increasing the SN ratio to at least the threshold is determined as the speaking instruction, and when the SN ratio is below the threshold and the action determined as the speaking instruction instructs the user to move closer to the microphone array and speak, the computer further executes switching from the one output designated in (c) to output from the microphone array, and causing the speech signal obtained by the microphone array to be input as the first content recognized in (d) or the second content recognized in (f).

* * * * *